US012803743B2

(12) United States Patent
Zhao et al.

(10) Patent No.: US 12,803,743 B2
(45) Date of Patent: Nov. 17, 2026

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Shichang Zhang, Dongguan (CN); Huei-Ming Lin, Taipei (CN); Teng Ma, Dongguan (CN); Yi Ding, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 298 days.

(21) Appl. No.: 18/439,705

(22) Filed: Feb. 12, 2024

(65) Prior Publication Data

US 2024/0187181 A1 Jun. 6, 2024

Related U.S. Application Data

(63) Continuation of application No. PCT/CN2021/114335, filed on Aug. 24, 2021.

(51) Int. Cl.
*H04L 5/00* (2006.01)

(52) U.S. Cl.
CPC .................................. *H04L 5/0051* (2013.01)

(58) Field of Classification Search
None
See application file for complete search history.

(56) References Cited

U.S. PATENT DOCUMENTS 11,109,363 B2 * 8/2021 Huang .................. H04L 1/1896
12,451,951 B2 * 10/2025 Guo ................... H04B 7/06964
2020/0328852 A1 10/2020 Tang
2020/0352060 A1 * 11/2020 Kim ......................... H04B 1/08
2020/0359366 A1 11/2020 Kim
2021/0385685 A1 * 12/2021 Khoryaev ............. H04W 72/02
2022/0053483 A1 * 2/2022 Yoshioka .......... H04W 72/1268
(Continued)

FOREIGN PATENT DOCUMENTS

CN 107786249 A 3/2018
CN 108134624 A 6/2018
(Continued)

OTHER PUBLICATIONS

Supplementary European Search Report issued on Oct. 7, 2024 for the corresponding European Patent Application No. 21954489.7.
(Continued)

*Primary Examiner* — Jay P Patel
(74) *Attorney, Agent, or Firm* — Ladas & Parry, LLP

(57) ABSTRACT

Provided are a wireless communication method and a terminal device. The wireless communication method includes: a first terminal device transmits M CSI-RSs to a second terminal device in a first slot using at least one spatial domain transmission filter, wherein the M CSI-RSs are configured for selecting a target spatial domain transmission filter, or the M CSI-RSs are configured for selecting a target spatial domain reception filter, and each of the M CSI-RSs occupies N time domain symbol(s), M and N are positive integers, and M>1.

15 Claims, 14 Drawing Sheets

(56) References Cited

U.S. PATENT DOCUMENTS

| | | | | |
|---|---|---|---|---|
| 2022/0061041 | A1* | 2/2022 | Chen | H04W 72/20 |
| 2022/0217686 | A1* | 7/2022 | Matsumura | H04B 7/0628 |
| 2022/0330241 | A1* | 10/2022 | Zhao | H04L 5/0048 |
| 2022/0376864 | A1* | 11/2022 | Zhao | H04L 5/0044 |
| 2022/0399917 | A1* | 12/2022 | Shin | H04B 7/0408 |
| 2022/0399927 | A1* | 12/2022 | Tsai | H04B 7/0695 |
| 2023/0007582 | A1* | 1/2023 | Yunusov | H04W 52/0229 |
| 2023/0069882 | A1* | 3/2023 | Zhao | H04L 5/0053 |
| 2023/0118141 | A1* | 4/2023 | Jiao | H04L 5/0051 370/329 |
| 2023/0123147 | A1* | 4/2023 | Hwang | H04W 72/02 370/329 |
| 2023/0224096 | A1* | 7/2023 | Gubeskys | H04L 1/1671 370/329 |
| 2023/0345505 | A1* | 10/2023 | Guo | H04L 5/0053 |
| 2024/0178895 | A1* | 5/2024 | Zhao | H04B 7/0695 |
| 2024/0187187 | A1* | 6/2024 | Jung | H04L 5/0051 |
| 2024/0204851 | A1* | 6/2024 | Yuan | H04B 7/0695 |
| 2024/0244449 | A1* | 7/2024 | Zhao | H04W 16/28 |
| 2024/0334452 | A1* | 10/2024 | Gao | H04L 5/0094 |

FOREIGN PATENT DOCUMENTS

| | | | | |
|---|---|---|---|---|
| CN | 108631830 A | | 10/2018 | |
| CN | 109981155 A | | 7/2019 | |
| CN | 111344956 A | | 6/2020 | |
| CN | 115943580 B | * | 5/2025 | H04L 1/1861 |
| WO | 2019128418 A1 | | 7/2019 | |
| WO | 2021096977 A1 | | 5/2021 | |
| WO | 2021101196 A1 | | 5/2021 | |
| WO | 2023023946 A1 | | 3/2023 | |

OTHER PUBLICATIONS

International Search Report in the international application No. PCT/CN2021/114335, mailed on May 17, 2022.

Written Opinion of the International Search Authority in the international application No. PCT/CN2021/114335, mailed on May 17, 2022. 8 pages with English translation.

3GPP TSG RAN WG1 NR ad-hoc R1-1700477, Spokane, USA Jan. 16-20, 2017, Agenda item: 5.1.2.3.1, Source: LG Electronics, Title: Considerations on NR CSI-RS design for beam management, Document for: Discussion and Decision. the whole document.

* cited by examiner (a)

(b)

WIRELESS COMMUNICATION METHOD AND TERMINAL DEVICE

CROSS-REFERENCE TO RELATED APPLICATION

This is a continuation of International Application No. PCT/CN2021/114335 filed on Aug. 24, 2021, the disclosure of which is hereby incorporated by reference in its entirety.

BACKGROUND

In order to improve a transmission rate of a sidelink communication system, a millimeter wave frequency band is considered to be used in the sidelink transmission system. In the sidelink millimeter wave transmission, a transmitting terminal needs to transmit Channel State Information Reference Signals (CSI-RSs) to determine an optimal spatial domain transmission filter of the transmitting terminal and/or an optimal spatial domain reception filter of a receiving terminal. However, how to transmit the CSI-RSs to select the optimal spatial domain transmission filter or the optimal spatial domain reception filter is a problem to be solved.

SUMMARY

Embodiments of the present disclosure relate to the communication field, and provide a method for wireless communication and a terminal device. A transmitting terminal may transmit a plurality of CSI-RSs in a slot, so that an optimal spatial domain transmission filter of the transmitting terminal may be selected based on the transmitted CSI-RSs, or an optimal spatial domain reception filter of a receiving terminal may be selected based on the transmitted CSI-RSs.

According to a first aspect, there is provided a method for wireless communication, which includes the following operations.

A first terminal device transmits M channel state information reference signals (CSI-RSs) to a second terminal device in a first slot using a spatial domain transmission filter.

The M CSI-RSs are configured for selecting a target spatial domain transmission filter, or the M CSI-RSs are configured for selecting a target spatial domain reception filter, and each of the M CSI-RSs occupies N time domain symbol(s). M and N are positive integers, and M>1.

According to a second aspect, there is provided a method for wireless communication, which includes the following operations.

A second terminal device receives M CSI-RSs transmitted by a first terminal device in a first slot using a spatial domain transmission filter.

The M CSI-RSs are configured for selecting a target spatial domain transmission filter, or the M CSI-RSs are configured for selecting a target spatial domain reception filter, and each of the M CSI-RSs occupies N time domain symbol(s). M and N are positive integers, and M>1.

According to a third aspect, there is provided a terminal device, configured to implement the method in the above first aspect. Specifically, the terminal device includes functional modules for implementing the method in the above first aspect.

According to a fourth aspect, there is provided a terminal device, configured to implement the method in the above second aspect. Specifically, the terminal device includes functional modules for implementing the method in the above second aspect.

According to a fifth aspect, there is provided a terminal device, including a processor and a memory. The memory is configured to store a computer program, and the processor is configured to call and run the computer program stored in the memory to implement the method in the first aspect.

According to a sixth aspect, there is provided a terminal device, including a processor and a memory. The memory is configured to store a computer program, and the processor is configured to call and run the computer program stored in the memory to implement the method in the second aspect.

According to a seventh aspect, there is provided an apparatus, configured to implement the method in any of the first aspect to second aspect.

Specifically, the apparatus includes a processor. The processor is configured to call and run a computer program in a memory to cause a device equipped with the apparatus to implement the method in any of the first aspect to second aspect.

According to an eighth aspect, there is provided a computer-readable storage medium, configured to store a computer program. The computer program causes a computer to implement the method in any of the first aspect to second aspect.

According to a ninth aspect, there is provided a computer program product, including computer program instructions. The computer program instructions cause a computer to implement the method in any of the first aspect to second aspect.

According to a tenth aspect, there is provided a computer program. The computer program, when run on a computer, causes a computer to implement the method in any of the first aspect to second aspect.

According to the technical solutions, the first terminal device transmits M CSI-RSs to the second terminal device in the first slot by using the spatial domain transmission filter, and M>1, that is, the first terminal device can transmit a plurality of CSI-RSs in one slot, so that the delay of transmitting the plurality of CSI-RSs can be reduced compared with transmitting one CSI-RS in one slot, and the optimal spatial domain transmission filter of the first terminal device can be selected based on the CSI-RSs transmitted by the first terminal device, or the optimal spatial domain reception filter of the second terminal device can be selected based on the CSI-RSs transmitted by the first terminal device.

DETAILED DESCRIPTION

Figure 1:
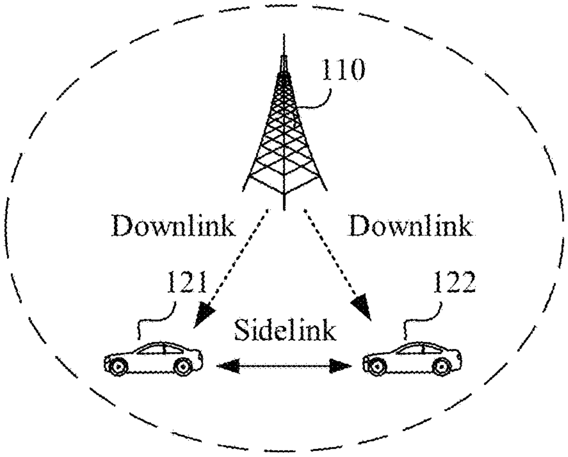
FIG. 1 is a schematic diagram of a communication system architecture applied in an embodiment of the present disclosure.

The technical solutions of the embodiments of the present disclosure will be described below in conjunction with the drawings in the embodiments of the present disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the present disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolved system of the NR system, an LTE-based access to unlicensed spectrum (LTE-U) system, an NR-based access to unlicensed spectrum (NR-U) system, a Non-Terrestrial Networks (NTN) system, a Universal Mobile Telecommunication System (UMTS), a Wireless Local Area Network (WLAN), Wireless Fidelity (WiFi), a 5th-Generation (5G) system, or another communication system.

Generally, connections supported by a conventional communication system are usually limited in number and also easy to implement. However, with the development of communication technologies, a mobile communication system will not only support conventional communication but also support, for example, Device to Device (D2D) communication, Machine to Machine (M2M) communication, Machine Type Communication (MTC), Vehicle to Vehicle (V2V) communication, or Vehicle to everything (V2X) communication. The embodiments of the present disclosure may also be applied to these communication systems.

In an embodiment, a communication system in the embodiments of the present disclosure may be applied to a Carrier Aggregation (CA) scenario, or a Dual Connectivity (DC) scenario, or a Standalone (SA) network deployment scenario.

In an embodiment, the communication system in the embodiments of the present disclosure may be applied to an unlicensed spectrum, where the unlicensed spectrum may also be considered as a shared spectrum; or, the communication system in the embodiments of the present disclosure may also be applied to a licensed spectrum, where the licensed spectrum may also be considered as a non-shared spectrum.

Each of the embodiments of the present disclosure is described in combination with a network device and a terminal device. The terminal device may be referred to as user equipment (UE), an access terminal, a subscriber unit, a subscriber station, a mobile station, a mobile radio station, a remote station, a remote terminal, a mobile device, a user terminal, a terminal, a wireless communication device, a user agent, or a user device, etc.

The terminal device may be a station (ST) in the WLAN, or may be a cell phone, a cordless phone, a Session Initiation Protocol (SIP) phone, a Wireless Local Loop (WLL) ST, a Personal Digital Assistant (PDA), a handheld device with a wireless communication function, a computing device, another processing device connected to a wireless modem, a vehicle-mounted device, a wearable device, a terminal device in a next-generation communication system, for example, an NR network, a terminal device in a future evolved Public Land Mobile Network (PLMN), or the like.

In the embodiments of the present disclosure, the terminal device may be deployed on land, including indoor or outdoor, handheld, wearable or onboard, or may be deployed on the water surface (such as a ship, or the like), or may be deployed in the air (such as an airplane, a balloon, a satellite, or the like).

In the embodiments of the present disclosure, the terminal device may be a mobile phone, a pad, a computer with a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, or the like.

By way of example and not limitation, in the embodiments of the present disclosure, the terminal device may also be a wearable device. The wearable device, also referred to as a wearable intelligent device, is a generic term of wearable devices obtained by performing intelligent design and development on daily wearing products by using the wearable technology, such as glasses, gloves, watches, clothes, and shoes. The wearable device is a portable device directly worn or integrated to clothes or accessory of a user. The wearable device not only is a hardware device but also realizes powerful functions by software support, data interaction, and cloud interaction. Generalized wearable intelligent devices include full-featured, large size and complete or partial functions realized without relying on smart phones, such as smart watches or smart glasses, and includes only a certain application function, which is necessary to be used in conjunction with other devices such as a smart phone, such as various smart bracelets and smart jewelry for monitoring physical signs.

In the embodiments of the present disclosure, the network device may be a device configured to communicate with a mobile device. The network device may be an Access Point (AP) in the WLAN, a Base Transceiver Station (BTS) in the GSM or CDMA, or may be a NodeB (NB) in WCDMA, or may be an Evolutional Node B (eNB or eNodeB) in the LTE, or a relay ST or AP, or a vehicle-mounted device, a wearable device, a network device or a base station (a gNB) in the NR network, a network device in the future evolved PLMN, or a network device in the NTN network, etc.

By way of example and not limitation, in the embodiments of the present disclosure, the network device may have mobile characteristics. For example, the network device may be a mobile device. In an embodiment, the network device may be a satellite or a balloon ST. For example, the satellite may be a low earth orbit (LEO) satellite, a medium earth orbit (MEO) satellite, a geostationary earth orbit (GEO) satellite, a high elliptical orbit (HEO) satellite, and the like. In an embodiment, the network device may also be a base station arranged on land, water or another place.

In the embodiments of the present disclosure, the network device may provide services for a cell, and the terminal device communicates with the network device through a transmission resource (for example, a frequency-domain resource or a spectrum resource) for the cell. The cell may be a cell corresponding to the network device (for example, a base ST). The cell may belong to a macro base station or a base station corresponding to a small cell. The small cell may include a metro cell, micro cell, pico cell, femto cell, etc. These small cells have the characteristics of small coverage and low transmission power, and are suitable for providing high-speed data transmission services.

It should be understood that the terms “system” and “network” may usually be exchanged herein. The term “and/or” in the disclosure is only an association relationship describing associated objects, for example, represents that previous and next associated objects may have three relationships. For example, A and/or B may represent three conditions: i.e., independent existence of A, existence of both A and B, and independent existence of B. The character “/” in the disclosure usually represents that previous and next associated objects form an “or” relationship.

Terms used in the embodiments of the present disclosure are used only for explanation of specific embodiments of the present disclosure and are not intended to limit the disclosure. Terms “first”, “second”, “third”, “fourth”, etc. in the drawings, description and claims of the present disclosure are used to distinguish different objects, and are not used to describe a particular order. Furthermore, the terms “including” and “having” and any variations thereof are intended to cover non-exclusive inclusion.

It should be understood that the term “indication” mentioned in the embodiments of the present disclosure may be direct indication, or indirect indication, or indicate that there is an association relationship. For example, A indicating B may indicate that A directly indicates B, for example, B may be acquired through A, or indicate that A indirectly indicates B, for example, A indicates C, and B may be acquired through C, or indicate that there is an association relationship between A and B.

In the description of embodiments of the present disclosure, the term “correspondence” may indicate that there is a direct correspondence or indirect correspondence between the two elements, or may indicate that there is an association relationship between the two elements, or may indicate a relationship between indicating and being indicated, or between configuring and being configured.

In the embodiments of the present disclosure, the term “predefined” or “pre-configured” may be implemented by pre-storing corresponding codes, tables, or other manners for indicating relevant information in devices (e.g., including a terminal device and a network device). The specific implementation is not limited in the present disclosure. For example, “predefined” may refer to those defined in a protocol.

In the embodiments of the present disclosure, the term “protocol” may refer to a standard protocol in the communication field, which may include, for example, a LTE protocol, NR protocol and relevant protocol applied in the future communication system, which is not limited in the present disclosure.

In order to facilitate understanding of the technical solutions of the embodiments of the present disclosure, the technical solutions of the present disclosure will be described in detail by specific embodiments below. The following relevant technology as optional solutions may be combined with the technical solutions of the embodiments in any way, and shall fall within the scope of protection of the disclosure. The embodiments of the present disclosure include at least some of the following.

FIG. 1 is a schematic diagram of a communication system applied in an embodiment of the present disclosure. Transmission resources of vehicle terminals (including a vehicle terminal 121 and a vehicle terminal 122) are allocated by a base station 110, and the vehicle terminals transmit data on the sidelink according to the resources allocated by the base station 110. Specifically, the base station 110 may allocate resources for a single transmission to the terminal or may allocate resources for a semi-persistent transmission to the terminal.

Figure 2:
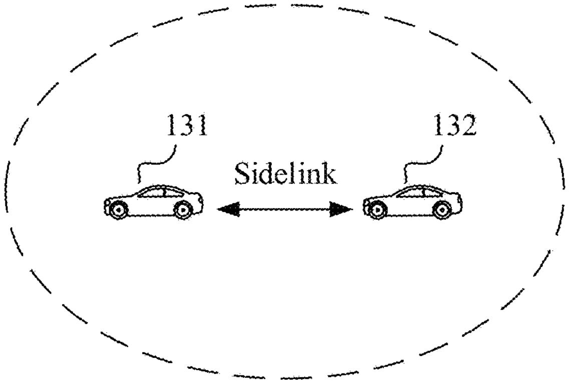
FIG. 2 is a schematic diagram of another communication system architecture applied in an embodiment of the present disclosure.

FIG. 2 is a schematic diagram of another communication system applied in an embodiment of the present disclosure. Vehicle terminals (including a vehicle terminal 131 and a vehicle terminal 132) select transmission resources independently from the sidelink resources for data transmission. In an embodiment, the vehicle terminals may select the transmission resources randomly or select the transmission resources by sensing.

Figure 3:
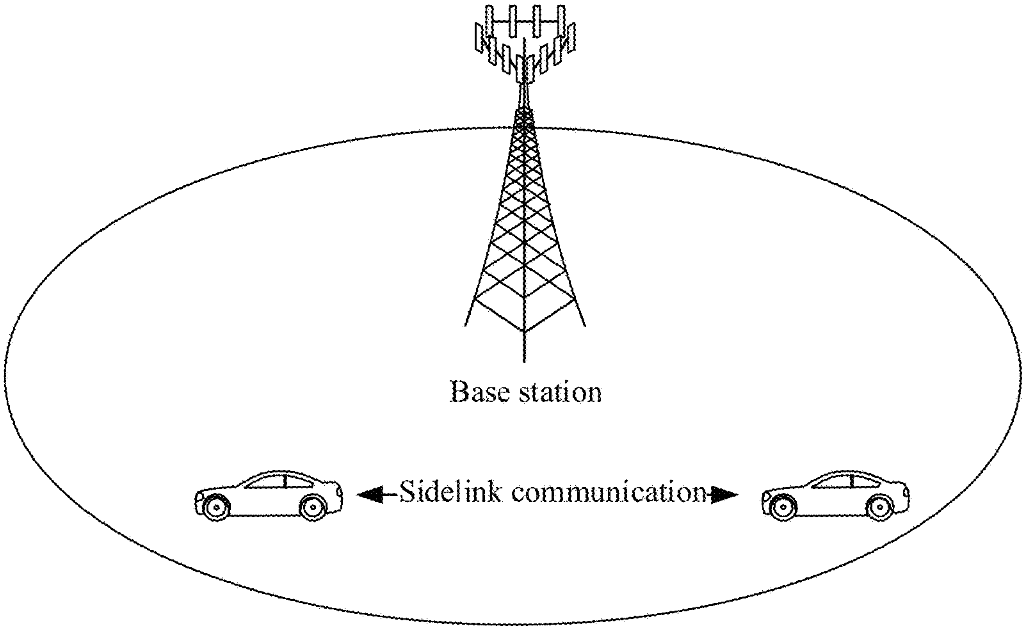
FIG. 3 is a schematic diagram of a sidelink communication in coverage provided by the present disclosure.
Figure 4:
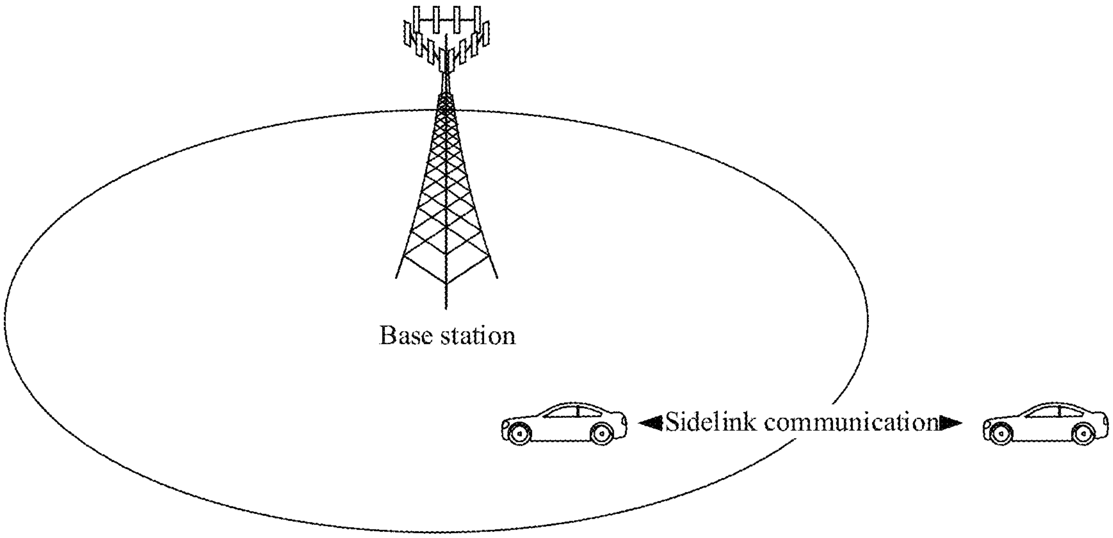
FIG. 4 is a schematic diagram of a sidelink communication partially in coverage provided by the present disclosure.
Figure 5:
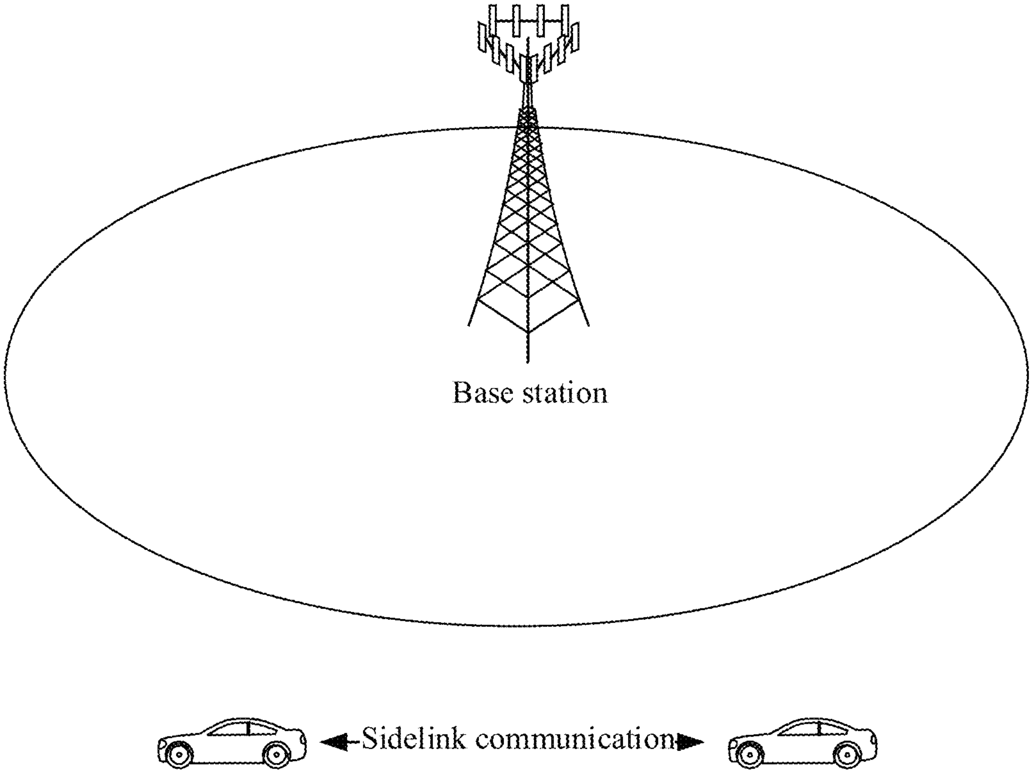
FIG. 5 is a schematic diagram of a sidelink communication out of coverage provided by the present disclosure.

It should be noted that in the sidelink communication, according to the network coverage situation of a terminal in communication, the sidelink communication may be divided into sidelink communication in coverage, as illustrated in FIG. 3, sidelink communication partially in coverage, as illustrated in FIG. 4, and sidelink communication out of coverage, as illustrated in FIG. 5.

Referring to FIG. 3, in the sidelink communication in coverage, all terminals performing sidelink communication are within the coverage of the base station, so that all of these terminals may perform sidelink communication based on the same sidelink configuration by receiving configuration signaling of the base station.

Referring to FIG. 4, in a case of sidelink communication partially covered by the network, a part of the terminals performing sidelink communication is located within the coverage of the base station, and the part of the terminals may receive a configuration signaling of the base station and perform sidelink communication according to the configuration of the base station. A terminal located outside the coverage of the network cannot receive the configuration signaling of the base station. In this case, the terminal outside the coverage of the network determines the sidelink configuration according to pre-configuration information and information carried in the physical sidelink broadcast channel (PSBCH) transmitted by the terminal located within the coverage, and performs sidelink communication.

Referring to FIG. 5, for the sidelink communication out of coverage, all terminals performing sidelink communication are located outside the coverage, and all terminals determine sidelink configuration based on pre-configuration information to perform sidelink communication.

Figure 6:
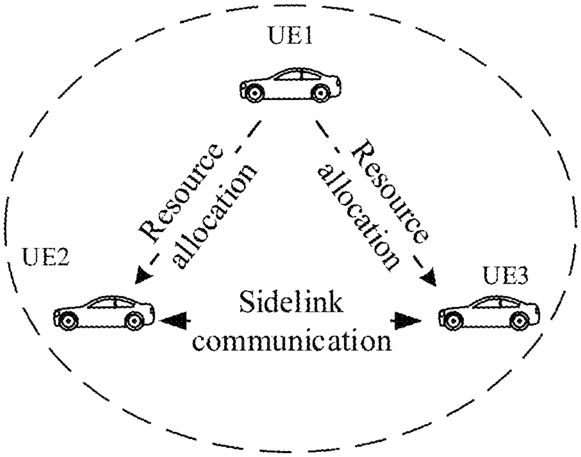
FIG. 6 is a schematic diagram of a sidelink communication with a central control node provided by the present disclosure.

Referring to FIG. 6, for sidelink communication with a central control node, a plurality of terminals form a communication group. The communication group has a central control node and may also be called as a Cluster Header (CH). The central control node has one of the following functions: responsible for establishment of the communication group, and adding and removal of group members; performing resource coordination, allocating sidelink transmission resources for other terminals and receiving sidelink feedback information of other terminals; resource coordination with other communication groups and other functions.

It should be noted that device-to-device (D2D) communication is a D2D-based Sidelink (SL) transmission technology. Different from the mode in a traditional cellular system in which communication data is received or transmitted through a base station, a system in Internet of vehicles adopts a mode of direct communication between terminals, and thus has higher spectrum efficiency and lower transmission delay. Two transmission modes are defined in the third Generation Partnership Project (3GPP), which are respectively recorded as a first mode (i.e., sidelink resource allocation mode 1) and a second mode (i.e., sidelink resource allocation mode 2).

In the first mode, transmission resources for a terminal are allocated by a base station, and the terminal transmits data on a sidelink according to the resources allocated by the base station. The base station may allocate resources of a single transmission for the terminal, and may also allocate resources of a semi-persistent transmission for the terminal. As illustrated in FIG. 3, the terminal is located within the network coverage, and the network allocates transmission resources for sidelink transmission for the terminal.

In the second mode, the terminal selects a resource from a resource pool to transmit data. As illustrated in FIG. 5, the terminal is located outside the coverage area of the cell, and the terminal selects transmission resources autonomously (independently) in the pre-configured resource pool for sidelink transmission. Alternatively, as illustrated in FIG. 3, the terminal selects the transmission resources autonomously in the resource pool configured by the network for sidelink transmission.

In the New Radio-Vehicle to Everything (NR-V2X), automatic driving is supported, so higher requirements are put forward for data interaction between vehicles, such as a higher throughput, lower delay, higher reliability, larger coverage and more flexible resource allocation.

Figure 7:
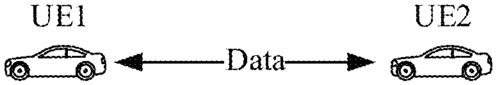
FIG. 7 is a schematic diagram of a unicast sidelink communication provided by the present disclosure.
Figure 8:
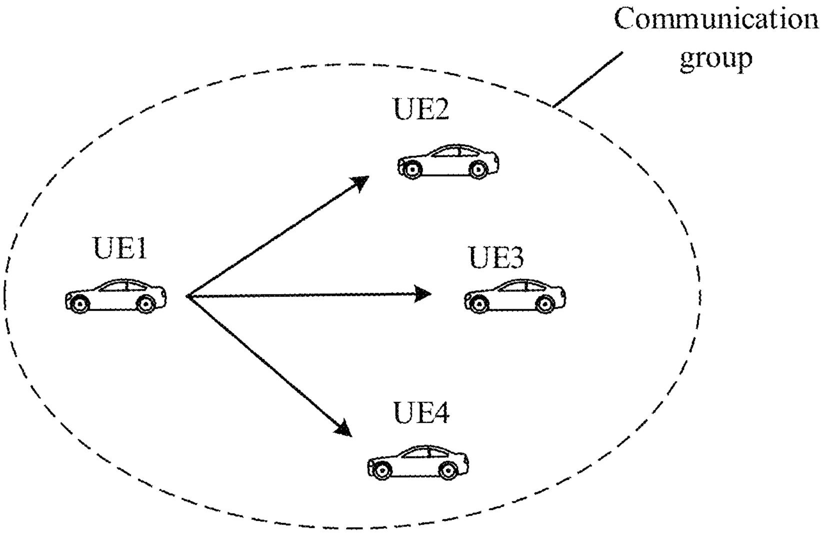
FIG. 8 is a schematic diagram of a multicast sidelink communication provided by the present disclosure.
Figure 9:
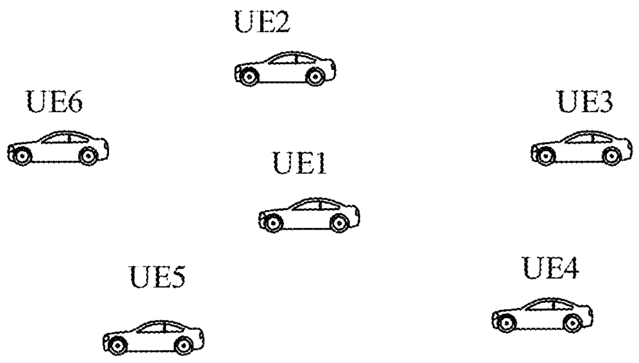
FIG. 9 is a schematic diagram of a broadcast sidelink communication provided by the present disclosure.

In the LTE-V2X, a broadcast transmission mode is supported, and in the NR-V2X, unicast and multicast transmission modes are introduced. For unicast transmission, there is only one terminal at the receiving end, as illustrated in FIG. 7, unicast transmission is performed between UE1 and UE2. For multicast transmission, the receiving terminal is all terminals in a communication group or all terminals within a certain transmission distance. As illustrated in FIG. 8, UE1, UE2, UE3 and UE4 form a communication group, in which UE1 transmits data, and other terminal devices in the group are receiving terminals. In the broadcast transmission mode, the receiving terminal is any terminal around a transmitting terminal, as illustrated in FIG. 9, UE1 is the transmitting terminal, and other terminals around UE1, i.e., UE2-UE6, are all receiving terminals.

In order to better understand the embodiments of the present disclosure, the frame structure of the NR-V2X system related to the present disclosure is described.

Figure 10:
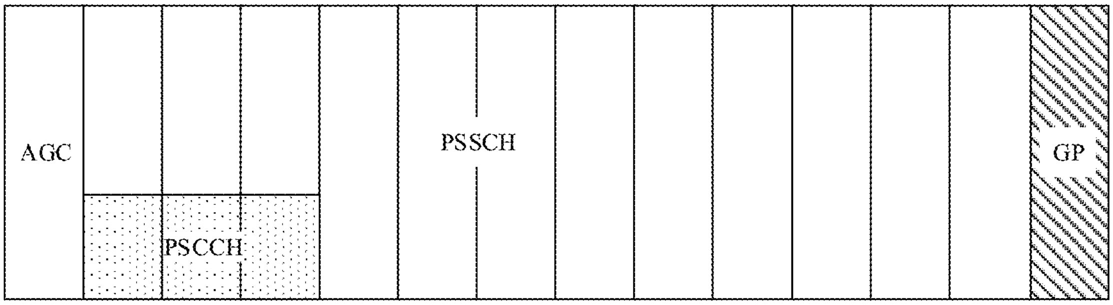
FIG. 10 is a schematic diagram of a slot structure in a New Radio-Vehicle to Everything (NR-V2X) provided by the present disclosure.
Figure 10:
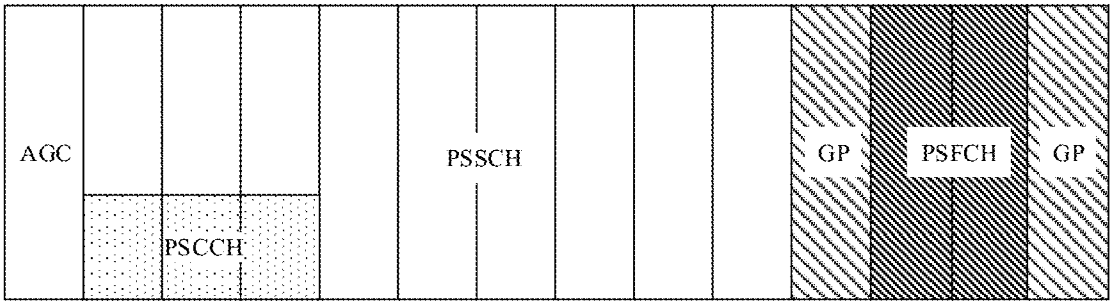

A slot structure in the NR-V2X is illustrated in FIG. 10. (a) in FIG. 10 illustrates a slot structure in which a Physical Sidelink Feedback Channel (PSFCH) is not included in the slot, and (b) in FIG. 10 illustrates a slot structure in which the PSFCH is included in the slot.

The Physical Sidelink Control Channel (PSCCH) in the NR-V2X occupies 2 or 3 Orthogonal frequency-division multiplexing (OFDM) symbols in the time domain starting from a second sidelink symbol of the slot, and may occupy {10, 12, 15, 20, 25} physical resource blocks (PRBs) in the frequency domain. In order to reduce the complexity of blind detection on the PSCCH by UE, only one PSCCH symbol number and PRB number may be configured in a resource pool. In addition, because the sub-channel is the minimum granularity of resource allocation for a Physical Sidelink Shared Channel (PSSCH) in the NR-V2X, the number of PRBs occupied by the PSCCH requires to be less than or equal to the number of PRBs contained in a sub-channel in the resource pool, so as to avoid additional restrictions on PSSCH resource selection or allocation. The PSSCH also starts from the second sidelink symbol of the slot in time domain, the last time domain symbol in the slot is a Guard Period (GP) symbol, and the PSSCH is mapped in the remaining symbols. A first sidelink symbol in the slot is repetition of the second sidelink symbol. The first sidelink symbol is used by the receiving terminal typically as an Automatic Gain Control (AGC) symbol, data on which is not used for data demodulation typically. The PSSCH occupies M sub-channels in the frequency domain, and each sub-channel includes N consecutive PRBs, as illustrated in (a) in FIG. 10.

When a PSFCH channel is included in a slot, a penultimate symbol and an antepenult symbol in the slot are used for PSFCH channel transmission, and data on the antepenult symbol is duplication of data on the penultimate symbol, and a time domain symbol preceding the PSFCH channel is used as a GP symbol, as illustrated in (b) in FIG. 10.

In order to better understand the embodiments of the present disclosure, the sidelink (SL) CSI-RS related to the present disclosure is described.

An SL CSI-RS is supported in the NR-V2X, and may be transmitted when the following three conditions are met.

A UE transmits the corresponding PSSCH, that is, the UE cannot transmit the SL CSI-RS only.

SL Channel State Information (CSI) report is activated by a high-level signaling.

When the SL CSI report is activated by the high-level signaling, the corresponding bit in second-stage sidelink control information (SCI) transmitted by the UE triggers the SL CSI report.

The maximum number of ports supported by the SL CSI-RS is 2. When there are two ports, SL CSI-RSs of different ports are multiplexed on two adjacent Resource Elements (REs) of the same OFDM symbol by code division. The number of SL CSI-RSs of each port in a PRB is 1, that is, the density is 1. Therefore, within a PRB, the SL CSI-RS may appear only on at most one OFDM symbol, and the specific position of the OFDM symbol is determined by the transmitting terminal. The position of the OFDM symbol where the SL CSI-RS is located is indicated by an SL CSI-RS first symbol parameter (sl-CSI-RS-FirstSymbol) in the PC5-Radio Resource Control (RRC).

Figure 11:
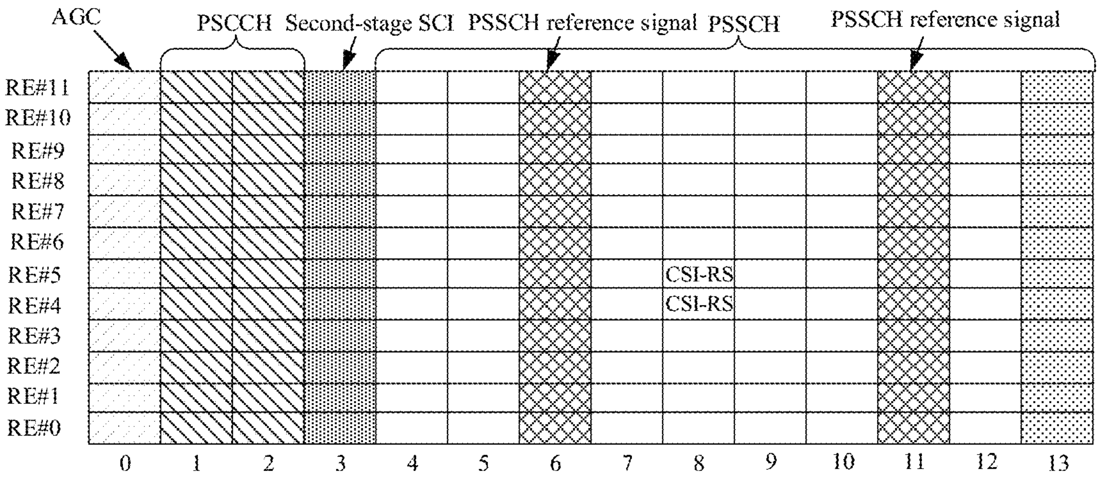
FIG. 11 is a schematic diagram of a time-frequency position of a SL CSI-RS provided by the present disclosure.

The position of the first RE occupied by the SL CSI-RS in a PRB is indicated by an SL CSI-RS frequency domain allocation parameter (sl-CSI-RS-FreqAllocation) in the PC5-RRC. If the SL CSI-RS is one-port CSI-RS, the parameter is a bitmap with a length of 12 corresponding to 12 REs within a PRB. If the SL CSI-RS is two-port CSI-RS, the parameter is a bitmap with a length of 6, and in such case, the SL CSI-RS occupies two REs, i.e., 2f(1) and 2f(1)+1, where f(1) represents an index of a bit with a value of 1 in the bitmap. The frequency domain position of the SL CSI-RS is also determined by the transmitting terminal, but the determined frequency domain position of the SL CSI-RS cannot collide with the Phase Tracking Reference Signal (PT-RS). FIG. 11 illustrates a schematic diagram of a time-frequency position of an SL CSI-RS. In FIG. 11, the number of SL CSI-RS ports is 2, sl-CSI-RS-FirstSymbol is 8, si-CSI-RS-FreqAllocation is $[b_5, b_4, b_3, b_2, b_1, b_0]=[0, 0, 0, 1, 0, 0]$, that is, f(1)=2, 2f(1)=4 and 2f(1)+1=5, and SL CSI-RSs occupy RE #4 and RE #5.

In order to better understand the embodiments of the present disclosure, a multi-beam system related to the present disclosure is described.

A design goal of the NR or 5G system includes large bandwidth communication in a high frequency band (such as a frequency band above 6 GHz). When the operating frequency becomes higher, the path loss in transmission will increase, thus affecting the coverage ability of a high frequency system. In order to guarantee the coverage of the high-frequency NR system effectively, an effective technical scheme is based on Massive antenna array (MIMO) to form a shaped beam with a greater gain, thereby avoiding propagation loss and ensuring the coverage of the system.

Millimeter wave antenna array, because of shorter wavelength, and smaller antenna array spacing and aperture, can make more physical antenna arrays integrated in a limited size of two-dimensional antenna array. Further, due to the limited size of millimeter wave antenna array, considering the hardware complexity, cost and power consumption, etc., digital beamforming cannot be adopted, but analog beamforming is adopted usually, which can reduce the implementation complexity of the device while enhancing the network coverage and.

A cell (sector) uses a wider beam to cover the whole cell. Therefore, at every moment, terminal devices within the coverage area of the cell have an opportunity to obtain transmission resources allocated by the system.

A multi-beam system in the NR/5G covers the whole cell through different beams, that is, each beam covers a smaller range, and an effect of multiple beams covering the whole cell is realized through sweeping in time.

Figure 12:
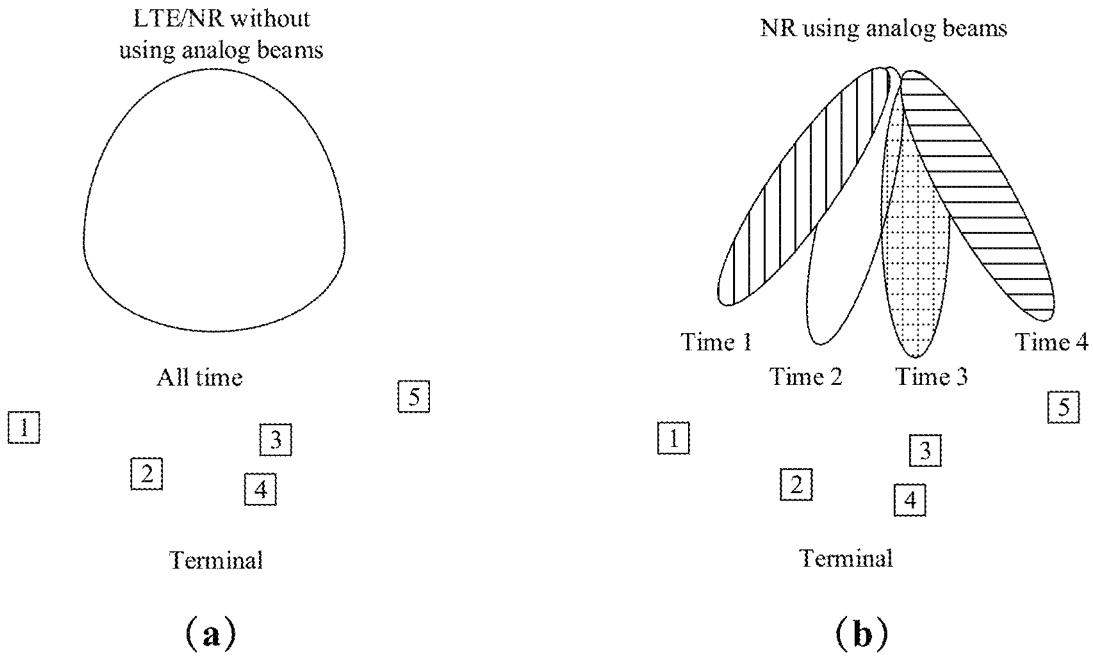
FIG. 12 is a schematic diagram of a system without and with analog beams provided by the present disclosure.

FIG. 12 illustrates a schematic diagram of a system without beamforming and with beamforming. (a) in FIG. 12 is a conventional LTE and NR system without using beamforming, and (b) in FIG. 12 is an NR system with using beamforming.

In (a) of FIG. 12, the LTE/NR network side device uses a wide beam to cover the whole cell, and users 1-5 may receive network signals at any time.

Instead, in (b) of FIG. 12, the network side device uses narrower beams (e.g., beams 1-4), and different beams are used to cover different areas in the cell at different times, for example, at time 1, the NR network side device covers the area where the user 1 is located through the beam 1. At time 2, the NR network side device covers the area where the user 2 is located through the beam 2. At time 3, the NR network side device covers the area where the user 3 and the user 4 are located through the beam 3. At time 4, the NR network side device covers the area where the user 5 is located through the beam 4.

In (b) of FIG. 12, because the network uses the narrower beam, the transmission energy can be more concentrated, so a longer distance can be covered. At the same time, because the beams are narrower, each beam can only cover part of the cell, so analog beamforming is "trading time for space".

The analog beamforming may be used not only for a network side device device, but also for a terminal. At the same time, the analog beamforming may be used not only for transmitting a signal (referred to as a transmission beam), but also for receiving a signal (referred to as a reception beam).

Different beams are identified by different signals carried on them.

Different synchronization signal blocks (SS blocks) are transmitted on some different beams, and the terminal device may distinguish different beams through the different SS blocks.

Different CSI-RSs are transmitted on some different beams, and the terminal device identifies different beams through CSI-RS signals/CSI-RS resources.

In a multi-beam system, a Physical Downlink Control Channel (PDCCH) and a Physical Downlink Shared Channel (PDSCH) may be transmitted through different downlink transmission beams.

For a system with a carrier frequency below 6 GHz, there is no analog beam generally on the terminal side. Therefore, one or more omni-directional antennas (or approximately omni-directional antennas) are used to receive signals transmitted by different downlink transmission beams of the base station.

For a millimeter wave system, there may be analog beams on the terminal side, and it is necessary to use a downlink reception beam to receive the signal transmitted by the corresponding downlink transmission beam. In such case, beam indication information is needed to assist the terminal device for determining related information of the transmission beam on the network side or related information of the corresponding reception beam on the terminal side.

In a NR protocol, the beam indication information does not indicate a beam itself directly, but provides indication by Quasi-co-located (QCL) assumption between signals (such as QCL assumption with QCL type of "QCL-TypeD"). On the terminal side, statistical characteristics for determining to receive the corresponding channel/signal are also based on the QCL assumption.

In order to better understand the embodiments of the present disclosure, QCL indication/assumption for downlink transmissions related to the present disclosure is described.

When the terminal receives a signal, in order to improve the receiving performance, the terminal may improve a receiving algorithm by using characteristics of the transmission environment corresponding to the data transmission. For example, statistical characteristics of the channel may be used to optimize design and parameters of a channel estimator. In the NR system, these characteristics of the data transmission are represented by QCL state (QCL-Info).

If downlink transmission comes from different Transmission Reception Points (TRPs)/antenna panels/beams, the characteristics of the transmission environment corresponding to the data transmission may also change. Therefore, in the NR system, when a downlink control channel or data channel is transmitted at the network side, the corresponding QCL state information may be indicated to the terminal through a Transmission Configuration Indicator (TCI) state.

A TCI state may include the following configuration: a TCI state identifier (ID) for identifying a TCI state; QCL information 1; QCL information 2 (optional).

QCL information also includes the following information: QCL type configuration, which may be one of QCL-Type A, QCL-TypeB, QCL-TypeC, or QCL-TypeD; and QCL reference signal configuration, including a Band Width Part (BWP) ID and an ID of a cell ID where a reference signal is located, and an ID of the reference signal (which may be a CSI-RS resource ID or an SSB index).

If both QCL information 1 and QCL information 2 are configured, a QCL type of at least one QCL information requires to be one of QCL-TypeA, QCL-TypeB and QCL-TypeC, and a QCL type of another QCL information requires to be QCL-Type D.

Different QCL type configurations are defined as follows:

'QCL-TypeA': {Doppler shift, Doppler spread, average delay, delay spread};

'QCL-TypeB': {Doppler shift, Doppler spread};

'QCL-TypeC': {Doppler shift, average delay};

'QCL-TypeD': {Spatial Rx parameter}.

In the NR system, a network side device may indicate a corresponding TCI state for a downlink signal or downlink channel.

If the network side device configures a QCL reference signal of a target downlink channel or target downlink signal as a reference SSB or a reference CSI-RS resource through a TCI state, and a QCL type is configured as TypeA, TypeB or TypeC, the terminal may assume that a large-scale parameter of the target downlink signal is the same as that of the reference SSB or the reference CSI-RS resource, and the large-scale parameter is determined through the QCL type configuration.

Similarly, if the network side device configures the QCL reference signal of the target downlink channel or target downlink signal as the reference SSB or the reference CSI-RS resource through the TCI state, and the QCL type is configured as TypeD, the terminal may receive the target downlink channel or target downlink signal using the same reception beam (i.e., Spatial Rx parameter) as that for receiving the reference SSB or the reference CSI-RS resource. Typically, the target downlink channel (or downlink signal) and reference SSB or reference CSI-RS resource thereof are transmitted by the network side device using the same TRP or the same panel or the same beam. If transmission TRPs or transmission panels or transmission beams for two downlink signals or downlink channels are different, different TCI states are configured.

For a downlink control channel, a TCI state corresponding to a Control Resource Set (CORESET) may be indicated by Radio Resource Control (RRC) signaling or RRC signaling+Media Access Control (MAC) signaling.

Figure 13:
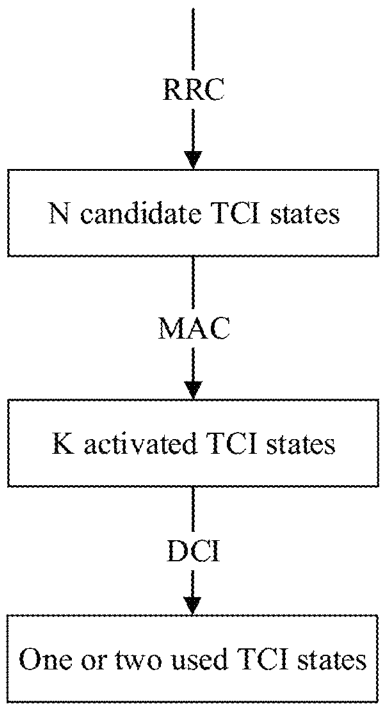
FIG. 13 is a schematic diagram of a TCI state configured with a physical downlink shared channel (PDSCH) provided by the present disclosure.

For a downlink data channel, an available TCI state set is indicated by RRC signaling, part of TCI states in the set is activated by MAC-layer signaling, and finally, one or two TCI states are indicated from the activated TCI states by a TCI state indication field in Downlink Control Information (DCI) for a PDSCH scheduled by the DCI. The case of 2 TCI states is mainly for multiple TRPs and similar scenarios. For example, as illustrated in FIG. 13, a network device indicates N candidate TCI states by RRC signaling, activates K TCI states by MAC signaling, and finally indicates one or two used TCI states from the activated TCI states by a TCI state indication field in the DCI.

In order to better understand the embodiment of the present disclosure, the existing technical problems related to the present disclosure are described.

In order to improve a transmission rate of a sidelink communication system, a millimeter wave frequency band is considered to be used in the sidelink transmission system. In the sidelink millimeter wave transmission, it is necessary to determine an optimal spatial domain transmission filter of a transmitting terminal and/or an optimal spatial domain reception filter of a receiving terminal. In the process of determining the transmission beam and reception beam, the transmitting terminal needs to transmit sidelink CSI-RSs. How to transmit the CSI-RSs to select the optimal spatial domain transmission filter (i.e., transmission beam) or spatial domain reception filter (i.e., reception beam) is a problem to be solved.

Based on the above problems, the present disclosure provides a scheme of transmitting sidelink CSI-RSs. A transmitting terminal may transmit a plurality of CSI-RSs in one slot, so that the delay of transmitting the plurality of CSI-RSs can be reduced, and an optimal spatial domain transmission filter of the transmitting terminal can be selected based on the transmitted CSI-RSs, or an optimal spatial domain reception filter of a receiving terminal can be selected based on the transmitted CSI-RSs.

The technical solutions of the present disclosure are described in detail below by specific embodiments.

Figure 14:
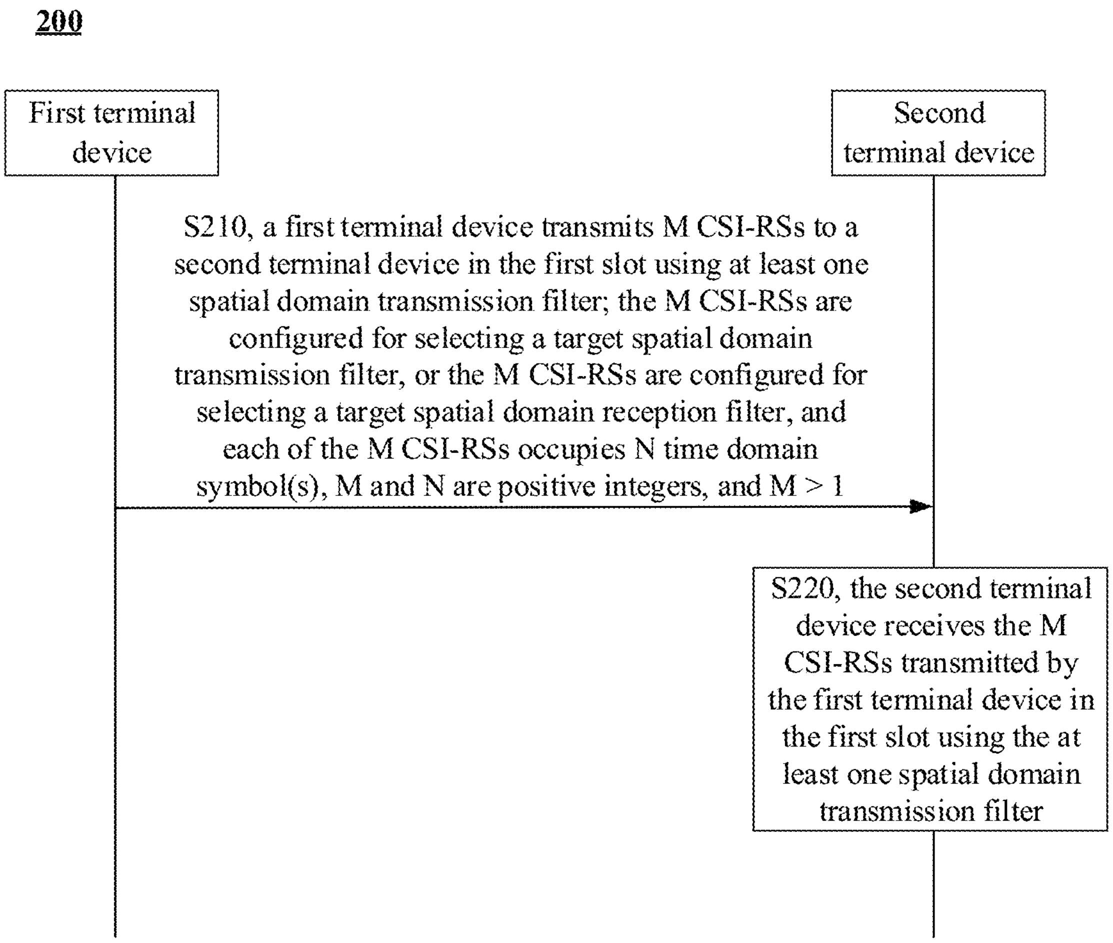
FIG. 14 is a schematic flowchart of a method for wireless communication provided by an embodiment of the present disclosure.

FIG. 14 is a schematic flowchart of a method 200 for wireless communication according to an embodiment of the present disclosure. As illustrated in FIG. 14, the method 200 for wireless communication may include at least part of the following contents.

At S210, a first terminal device transmits M CSI-RSs to a second terminal device in the first slot using spatial domain transmission filters. The M CSI-RSs are configured for selecting a target spatial domain transmission filter, or the M CSI-RSs are configured for selecting a target spatial domain reception filter, and each of the M CSI-RSs occupies N time domain symbol(s), M and N are positive integers, and M>1.

At S220, the second terminal device receives the M CSI-RSs transmitted by the first terminal device in the first slot using the spatial domain transmission filters.

In the embodiment of the present disclosure, the first terminal device is a transmitting terminal device, and the second terminal device is a receiving terminal device.

It should be noted that if only one CSI-RS is transmitted in one slot, one slot is required for each CSI-RS transmission. In the process of determining a spatial domain transmission filter (transmission beam) or target spatial domain reception filter (reception beam), multiple CSI-RSs need to be transmitted, which will lead to a large delay. In addition, each CSI-RS requires to be transmitted together with a PSSCH, which will reduce the transmission efficiency. Therefore, in order to reduce the delay of transmitting the CSI-RSs, the present disclosure designs symbol-level based CSI-RS transmission.

In the embodiment of the present disclosure, the first terminal device transmits the M CSI-RSs to the second terminal device in the first slot by using the spatial domain transmission filters, and M>1, that is, the first terminal device may transmit a plurality of CSI-RSs in one slot, so that the delay of transmitting the plurality of CSI-RSs can be reduced compared with transmitting one CSI-RS in one slot, and the spatial domain transmission filter and the spatial domain reception filter can be selected quickly, the delay for selection of spatial domain filters can be reduced, and the resource utilization can be improved. Further, an optimal spatial domain transmission filter of the first terminal device may be selected based on the CSI-RSs transmitted by the first terminal device, or an optimal spatial domain reception filter of the second terminal device may be selected based on the CSI-RSs transmitted by the first terminal device.

In a sidelink system, if data is transmitted in a beam manner, an optimal transmission beam needs to be determined at the transmitting terminal and an optimal reception beam needs to be determined at the receiving terminal. In the process of determining the beam, the transmitting terminal needs to transmit sidelink CSI-RSs.

In some embodiments, in the process of determining an optimal transmission beam of a transmitting terminal, for example, the transmitting terminal uses different beams to transmit CSI-RSs in turn, and a receiving terminal uses the same reception beams to receive the CSI-RSs transmitted by the transmitting terminal respectively, and measures the detected CSI-RSs, selects a CSI-RS with the optimal measurement result and feeds back (returns) resource information (such as, a CSI-RS resource index) of the CSI-RS to the transmitting terminal, and a transmission beam corresponding to the CSI-RS resource is a transmission beam optimal to the receiving terminal.

In some embodiments, in the process of determining an optimal reception beam of a receiving terminal, for example, a transmitting terminal transmits CSI-RSs using the same beams, preferably the transmitting terminal transmits the CSI-RSs using a transmission beam optimal to the receiving terminal. The receiving terminal receives the CSI-RSs transmitted by the transmitting terminal in turn using different reception beams and performs measurement, and selects a reception beam having the optimal measurement result as the optimal beam of the receiving terminal. When the transmitting terminal uses the optimal transmission beam for sidelink transmission, the receiving terminal may use the optimal reception beam corresponding to the optimal transmission beam for reception. In an embodiment, the transmitting terminal performs the above process for different transmission beams, and may determine the optimal reception beam corresponding to each transmission beam respectively. Therefore, when the transmitting terminal performs sidelink transmission, the transmitting terminal may indicate a transmission beam used for the sidelink transmission, and the receiving terminal may determine the corresponding optimal reception beam and perform sidelink reception by using the optimal reception beam.

In the embodiments of the present disclosure, in order to improve transmission rate of a sidelink communication system, the millimeter wave frequency band is used in the sidelink transmission system, and in the sidelink millimeter wave transmission, a transmitting terminal usually uses beamforming to perform sidelink transmission.

In some embodiments, the spatial domain transmission filter may also be referred to as a transmission beam or a spatial relation or a spatial setting.

In some embodiments, the spatial domain transmission filter and the spatial domain reception filter are referred to as spatial domain filters collectively. The spatial domain transmission filter may also be referred to as a transmitting-side spatial domain filter or a transmission beam, and the target spatial domain reception filter may also be referred to as a receiving-side spatial domain filter or a reception beam.

In the embodiments of the present disclosure, "slot" may also be other time unit, such as a micro-slot, frame, subframe, time domain symbol, absolute time, or relative time. Similarly, in the embodiments of the present disclosure, "time domain symbol" may also be other time unit, such as a micro-slot, frame, subframe, slot, absolute time, relative time, which is not limited to the present disclosure.

In some embodiments, the number of CSI-RSs included in one slot may be different. The number of CSI-RSs included in one slot depends on one or more of the following information: the number of time domain symbols available for sidelink transmission in the slot, the number of time domain symbols occupied by the PSCCH, the number of time domain symbols occupied by a physical sidelink shared channel demodulation reference signal (PSSCH DMRS), the number of time domain symbols occupied by CSI-RS resources, whether one or more PSFCH resources are included, etc. For example, a slot with no PSFCH resource includes M=4 CSI-RSs. A slot with a PSFCH resource includes M=3 CSI-RSs.

In some embodiments, CSI-RSs of the M CSI-RSs are sidelink CSI-RSs.

In some embodiments, the M CSI-RSs may also be replaced by other sidelink signals. That is, in S210, the first terminal device may transmit M sidelink signals to the second terminal device using the spatial domain transmission filters, where the M sidelink signals are used for selecting a target spatial domain transmission filter, or the M sidelink signals are used for selecting a target spatial domain reception filter.

In some embodiments, a sidelink signal in the M sidelink signals includes, but is not limited to, one of the following: a CSI-RS, Demodulation Reference Signal (DMRS), PSCCH DMRS, PSSCH DMRS, Positioning Reference Signal (PRS), Phase Tracking Reference Signal (PT-RS), or sidelink synchronization signal (including a sidelink primary synchronization signal and/or a sidelink secondary synchronization signal).

In some embodiments, "transmitting M CSI-RSs" in S210 may also be expressed as "transmitting M CSI-RS resources", which is not limited in the present disclosure. That is, in the embodiments of the present disclosure, the operation that the first terminal device transmits CSI-RSs may also be expressed as that the first terminal device transmits CSI-RS resources, that is, the two expressions are equivalent. Similarly, the measurement results of CSI-RSs are equivalent to the measurement results of CSI-RS resources.

In some embodiments, in the process of selecting the target spatial domain transmission filter or target spatial domain reception filter, the first terminal device may transmit CSI-RSs to the second terminal device using the spatial domain transmission filters in at least one slot, where the first slot is any one of the at least one slot.

In some embodiments, a value of M when the M CSI-RSs are used to select the target spatial domain transmission filter may be the same as or different from a value of M when the M CSI-RSs are used to select the target spatial domain reception filter, which is not limited in the present disclosure.

In some embodiments, the first terminal device transmits $M_1$ CSI-RS(s) to a third terminal device using at least one spatial domain transmission filter in the first slot in addition to transmitting the M CSI-RSs to the second terminal device using spatial domain transmission filters in the first slot. The $M_1$ CSI-RSs are used to select the target spatial domain transmission filter, or the $M_1$ CSI-RSs are used for selecting the target spatial domain reception filter. One of the $M_1$ CSI-RSs occupies $N_1$ time domain symbol, $M_1$ and $N_1$ are positive integers, and $M_1$>=1. That is, the first terminal device transmits M CSI-RSs for the second terminal device in the first slot and transmits $M_1$ CSI-RS(s) for the third terminal device in the first slot.

In some embodiments, each of the M CSI-RSs corresponds to a CSI-RS resource, and the CSI-RS resources corresponding to the M CSI-RSs are different from each other, that is, the M CSI-RSs may correspond to M CSI-RS resources respectively; or, at least two of the M CSI-RSs correspond to different CSI-RS resources. That is, the first terminal device transmits at least two CSI-RS resources using spatial domain transmission filters.

In some embodiments, the operation that the first terminal device transmits the M CSI-RSs to the second terminal device using the spatial domain transmission filters may mean that: the first terminal device transmits the M CSI-RSs using different spatial domain transmission filters, for example, the M CSI-RSs correspond to different spatial domain transmission filters respectively; or, the first terminal device transmits the M CSI-RSs without using the same spatial domain transmission filter, for example, transmitting the M CSI-RS using at least two different spatial domain transmission filters.

As an example, in S210, the first terminal device transmits the M CSI-RSs to the second terminal device using M different spatial domain transmission filters in the first slot, where each spatial domain transmission filter corresponds to one CSI-RS.

As an example, in S210, the first terminal device transmits the M CSI-RSs to the second terminal device using K spatial domain transmission filters in the first slot, where K is less than M, and K is greater than 1, that is, at least two of the M CSI-RSs are transmitted through different spatial domain transmission filters.

In some embodiments, in a case that the M CSI-RSs are configured for selecting the target spatial domain transmission filter, a repetition field corresponding to configuration information of CSI-RS resources or a CSI-RS resource set corresponding to the M CSI-RSs takes a first value, and the first value is configured for indicating that the first terminal device transmits the CSI-RSs without using a same spatial domain transmission filter. In other words, the first value is configured for indicating that the first terminal device transmits the CSI-RSs using different spatial domain transmission filters.

In some embodiments, the first value may be off, which indicates that the M CSI-RSs transmitted by the first terminal device are used to select the target spatial domain transmission filter.

In some embodiments, in a case that the M CSI-RSs are configured for selecting the target spatial domain reception filter, the repetition field in the configuration information of the CSI-RS resources or the CSI-RS resource set corresponding to the M CSI-RSs takes a second value, and the second value is configured for indicating that the first terminal device transmits the CSI-RSs using the same spatial domain transmission filter.

In some embodiments, the second value may be on, which indicates that the M CSI-RSs transmitted by the first terminal device are used to select the target spatial domain reception filter.

In some embodiments, in a case that the M CSI-RSs are configured for selecting the target spatial domain transmission filter, N≥2. That is, each of the M CSI-RSs occupies a plurality of time domain symbols. For example, N=2 or N=3.

In some embodiments, when N≥2, the N time domain symbols include a first time domain symbol and a second time domain symbol. Data on the first time domain symbol is the same as data on the second time domain symbol, or the data on the first time domain symbol is duplication of the data on the second time domain symbol.

In some embodiments, the first time domain symbol is an AGC symbol.

In some embodiments, the first time domain symbol is a first one in the N time domain symbols, and the second time domain symbol is a time domain symbol except the first time domain symbol in the N time domain symbols. Preferably, the second time domain symbol is a second one of the N time domain symbols.

It should be noted that if one CSI-RS occupies N time domain symbols, when CSI-RSs are transmitted using different spatial domain transmission filters in a slot, other terminals receive signals transmitted by the different spatial domain transmission filters in the slot, which will lead to the AGC problem, that is, power received on different time domain symbols is different and AGC adjustment needs to be re-performed. Therefore, when CSI-RS resources are transmitted using different spatial domain transmission filters in a slot, each CSI-RS resource should occupy at least two time domain symbols, where the first time domain symbol is used for the receiving terminal to perform the AGC adjustment and the CSI-RS is transmitted on the second time domain symbol. In an embodiment, the data on the first time domain symbol is duplication of the data on the second time domain symbol, or the data on both time domain symbols are the same.

Figure 15:
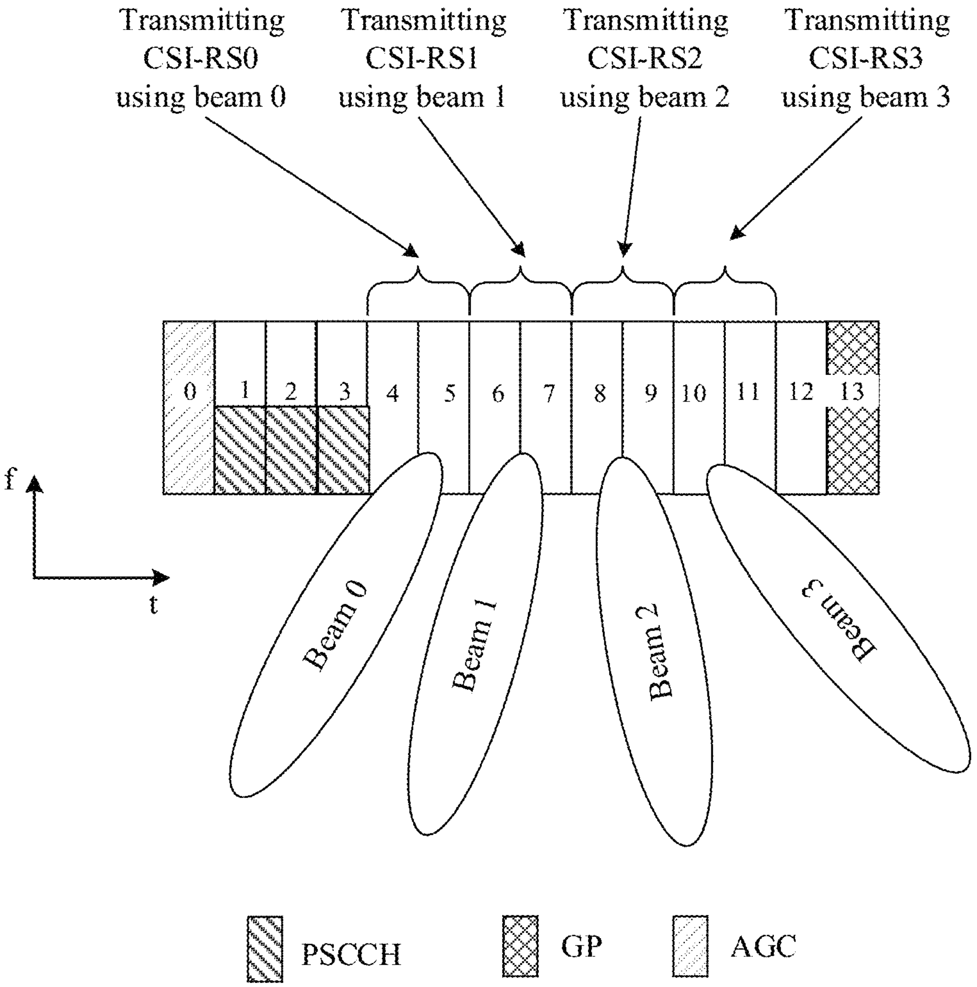
FIG. 15 and FIG. 16 are schematic diagrams of one CSI-RS occupying two time domain symbols provided by embodiments of the present disclosure.
Figure 16:
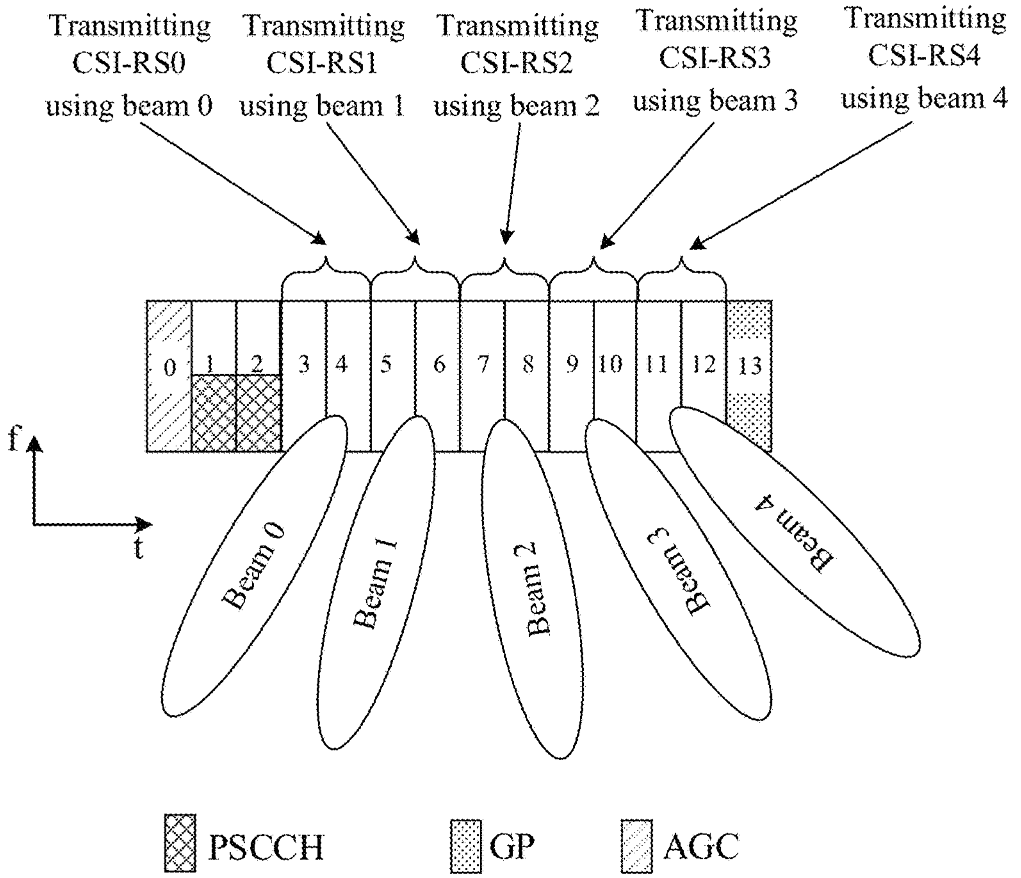

Specifically, for example, as illustrated in FIG. 15 and FIG. 16, the PSCCH occupies three time domain symbols and occupies two time domain symbols respectively. Each CSI-RS occupies 2 symbols, in which the first symbol may be used for AGC adjustment, and the CSI-RS is transmitted on the second symbol.

In the above embodiment, one CSI-RS occupies N time domain symbols. If the time required for switching beams is large relatively, such as more than ten microseconds, an additional GP symbol is needed for switching beams.

In some embodiments, the N time domain symbols include a first time domain symbol, a second time domain symbol and a third time domain symbol. Data on the first time domain symbol is the same as data on the second time domain symbol, or the data on the first time domain symbol is duplication of the data on the second time domain symbol, and the third time domain symbol is a GP symbol.

For example, the GP symbol is used to switch beams.

Figure 17:
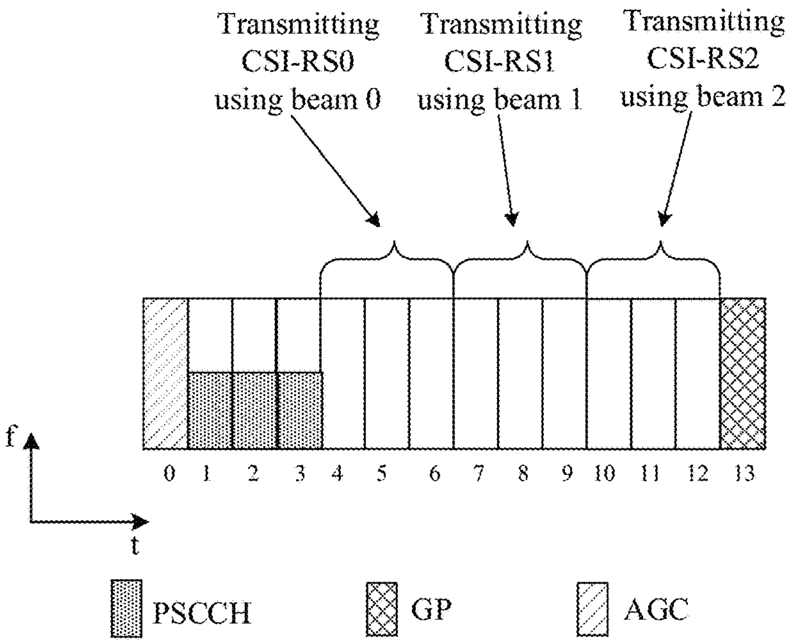
FIG. 17 is a schematic diagram of one CSI-RS occupying three time domain symbols provided by an embodiment of the present disclosure.

Specifically, for example, the N time domain symbols include three symbols, namely an AGC symbol, a symbol where the CSI-RS is located and a GP symbol. For example, as illustrated in FIG. 17, an order of the three symbols is the GP symbol, the AGC symbol and the symbol where the CSI-RS is located, or the order of the three symbols is the AGC symbol, the symbol where the CSI-RS is located and the GP symbol.

In some embodiments, when N≥2, the N time domain symbols include a fourth time domain symbol, and data on the fourth time domain symbol is mapped in a comb form. For example, when a comb granularity is 2, the data is mapped to odd (or even) subcarriers, and a value of a symbol on a subcarrier without mapping data is 0.

Specifically, for example, if the time for AGC adjustment performed by the terminal does not need a duration corresponding to one time domain symbol, for example, only a duration corresponding to half of a time domain symbol is needed to complete the AGC adjustment, the GP symbol for beam switching and the symbol for AGC adjustment may be combined into one symbol. For example, the first half of one symbol is GP for beam switching and the second half of the symbol is AGC for AGC adjustment by the receiving terminal.

In some embodiments, in a case that the M CSI-RSs are configured for selecting the target spatial domain transmission filter, the first slot does not coincide with a slot in which a sidelink transmission is located, and the slot in which the sidelink transmission is located is a slot in which the first terminal device transmits sidelink data to other terminal devices using a first spatial domain transmission filter. For example, the first spatial domain transmission filter is a target spatial domain transmission filter determined by the first terminal device for sidelink transmission with other terminal devices.

It should be noted that in the process of determining the optimal spatial domain transmission filter of the transmitting terminal, when the transmitting terminal uses different spatial domain transmission filters to transmit symbol-level CSI-RSs, because the transmitting terminal uses different spatial domain transmission filters, the receiving terminal needs to perform AGC adjustment for each spatial domain transmission filter in the slot, which affects the efficiency of normal data transmission. In addition, for existing terminals in the system, such as a terminal that does not support the selection of the spatial domain transmission filter, such terminal only performs AGC adjustment in the first symbol of the slot, and does not perform AGC adjustment in the slot with switching of the spatial domain transmission filters. Therefore, when there is an overlap between a slot carrying CSI-RSs for determining the spatial domain transmission filter and a slot for the normal sidelink transmission, the performance of the normal sidelink transmission may be affected.

Figure 18:
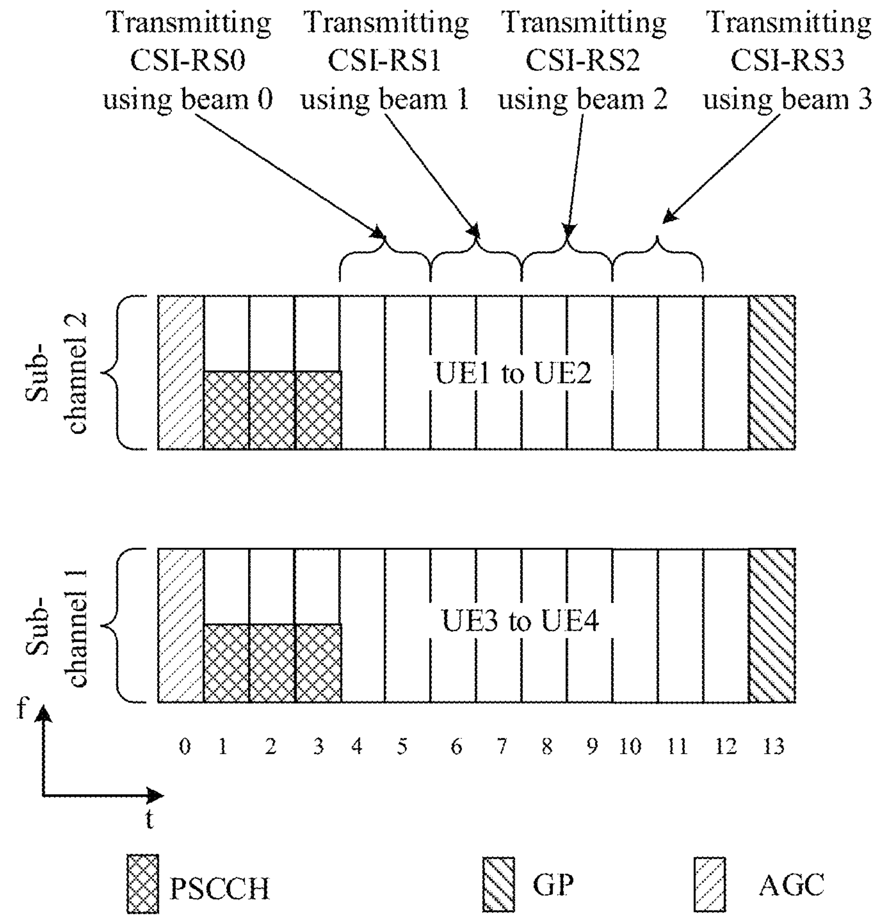
FIG. 18 is a schematic diagram of a sidelink transmission affected by transmitting CSI-RSs provided by an embodiment of the present disclosure.

For example, as illustrated in FIG. 18, UE1 and UE2 use sub-channel 2 to determine the optimal transmission beam at the transmitting end. Therefore, different beams are used to transmit a plurality of CSI-RSs in a slot, and normal sidelink transmission between UE3 and UE4 still exists in the slot. In such case, since UE1 switches the transmission beams to transmit the CSI-RSs, UE4 receives the sidelink transmission from UE3 with different received power on different time domain symbols in the slot, while UE4 does not perform multiple AGC adjustments in the slot, thus affecting reception of sidelink data from UE3 by UE4.

In some embodiments, the transmitting terminal may transmit different CSI-RSs using two spatial domain transmission filters in one slot when the power difference between the CSI-RSs transmitted by transmitting terminal using the two spatial domain transmission filters and received by the receiving terminal is less than a first threshold.

Specifically, the receiving terminal performs AGC adjustment on the first symbol. After the adjustment, the receiving terminal may normally receive signal transmission within a certain variation range of received power. Therefore, when the transmitting terminal uses different spatial domain transmission filters to transmit CSI-RSs, if the power difference between two spatial domain transmission filters is less than the first threshold, the receiving terminal may perform CSI-RS detection, CSI-RS measurement and the like directly without performing AGC adjustment again.

In some embodiments, in a case that the M CSI-RSs are configured for selecting the target spatial domain transmission filter, a difference between received power corresponding to any two of the M CSI-RSs is less than the first threshold.

In some embodiments, in a case that the M CSI-RSs are configured for selecting the target spatial domain transmission filter, a difference between received power corresponding to a first CSI-RS in the M CSI-RSs and received power corresponding to a CSI-RS of other M−1 CSI-RS(s) is less than the first threshold.

In some embodiments, in a case that the M CSI-RSs are configured for selecting the target spatial domain transmission filter, a difference between received power corresponding to any one of the M CSI-RSs and received power corresponding to a PSCCH in the first slot is less than the first threshold.

For example, in a slot, the beam for transmitting PSCCH is a first beam and the beam for transmitting a CSI-RS is a second beam. Only when the power difference between the PSCCH (transmitted by the first beam) and the CSI-RS (transmitted by the second beam) received by the receiving terminal is less than the first threshold, the transmitting terminal can use the second beam to transmit the CSI-RS in the slot; otherwise, the second beam cannot be used to transmit the CSI-RS in the slot. The receiving terminal refers to a terminal that needs to receive the CSI-RS, or a terminal corresponding to a Destination ID in SCI, or another terminal corresponding to the transmitting terminal for transmitting the CSI-RS in a unicast link.

Figure 19:
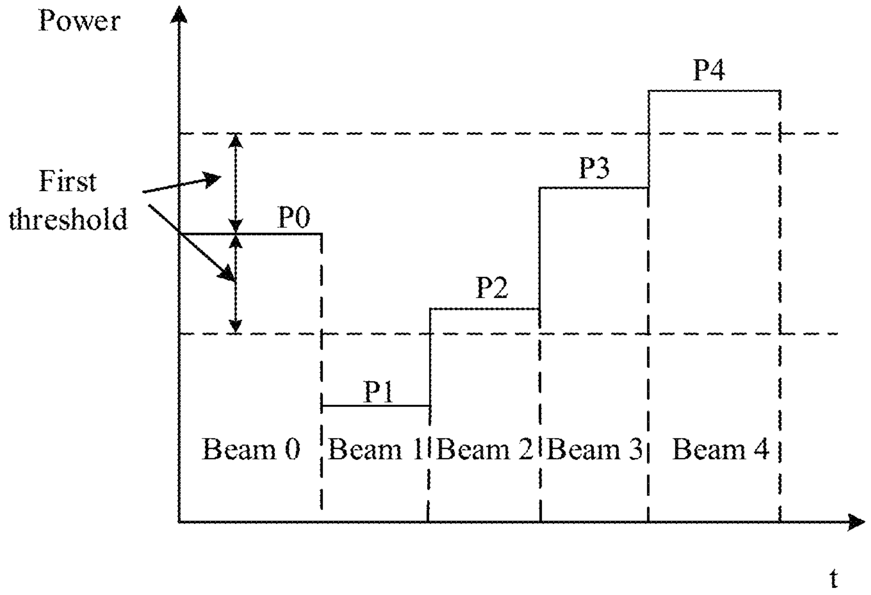
FIG. 19 is a schematic diagram of a first threshold provided by an embodiment of the present disclosure.

Specifically, for example, as illustrated in FIG. 19, beam 0 corresponds to a beam used for transmitting a PSCCH, and beam 1, beam 2, beam 3 and beam 4 are beams used for transmitting CSI-RSs respectively, and corresponding received powers of the beams are P0 to P4, respectively. If CSI-RSs are transmitted using beam 1 and beam 4, a difference between received power corresponding to beam 1 or beam 4 and received power corresponding to beam 0 exceeds the first threshold. Therefore, the CSI-RSs cannot be transmitted using beam 1 and beam 4 in the slot, and CSI-RS resources may be transmitted using beam 2 and beam 3.

In some embodiments, the first threshold is agreed in protocol or pre-configured, or the first threshold is configured by a network device, or the first threshold is configured by the first terminal device.

In some embodiments, in a case that the M CSI-RSs are configured for selecting the target spatial domain transmission filter, power on N time domain symbols corresponding to one of the M CSI-RSs is the same.

In some embodiments, in a case that the M CSI-RSs are configured for selecting the target spatial domain transmission filter, power on time domain symbols carrying the PSCCH in the first slot is the same.

In some embodiments, when the power difference between CSI-RSs transmitted by the transmitting terminal using two spatial domain transmission filters and received by the receiving terminal is less than the first threshold, N=1, that is, one CSI-RS occupies one time domain symbol.

In some embodiments, at least one spatial domain transmission filter corresponding to the M CSI-RSs is different from a spatial domain transmission filter corresponding to a PSCCH.

Specifically, in the process of determining the spatial domain transmission filter of the transmitting terminal, a parameter repetition corresponding to CSI-RS resources is off, that is, the transmitting terminal uses different beams (or spatial domain transmission filters) to transmit the CSI-RSs. In such case, the transmitting terminal and the receiving terminal have not selected an optimal spatial domain transmission filter. If a certain spatial domain transmission filter is used to transmit the PSCCH, the receiving terminal may not receive the PSCCH correctly. Therefore, the PSCCH may be transmitted using a wide beam or in an omni-directional direction. Because the code rate of the PSCCH is usually low, the receiving terminal can receive the PSCCH correctly even if the wide beam or omni-directional transmission is used. In the process of transmitting CSI-RSs, in order to enable the receiving terminal to select the optimal beam (or spatial domain transmission filter) according to the measurement results of the CSI-RSs, the transmitting terminal needs to use different spatial domain transmission filters to transmit the CSI-RSs. Therefore, the transmitting terminal transmits a PSCCH and a CSI-RS using different spatial domain transmission filters.

In some embodiments, the first terminal device transmits the PSCCH using the same spatial domain transmission filter as that used by the first terminal device for broadcast transmission.

In some embodiments, in a case that the M CSI-RSs are configured for selecting the target spatial domain reception filter, N≥1. That is, each of the M CSI-RSs occupies at least one time domain symbol. For example, N=1.

In some embodiments, in a case that the M CSI-RSs are configured for selecting the target spatial domain reception filter, the at least one spatial domain transmission filter corresponding to the M CSI-RSs is different from a spatial domain transmission filter corresponding to a PSCCH, or the at least one spatial domain transmission filter corresponding to the M CSI-RSs is the same as the spatial domain transmission filter corresponding to the PSCCH.

In the process of determining the spatial domain transmission filter of the receiving terminal, the parameter repetition corresponding to CSI-RS resources is on, that is, the transmitting terminal uses the same beam (or spatial domain transmission filter) to transmit CSI-RSs, and the beam is usually the optimal transmission beam of the transmitting terminal. Therefore, the transmitting terminal may use the beam to transmit the PSCCH and the CSI-RSs, so that the receiving terminal can receive PSCCH correctly and measure the corresponding CSI-RSs.

In an embodiment, the transmitting terminal may also use different beams to transmit the PSCCH and CSI-RSs respectively, such as using beam 1 to transmit the PSCCH and using beam 2 to transmit all CSI-RSs. The beam 1 is an omni-directional beam, so that all surrounding UEs can detect the PSCCH, so as to perform corresponding sensing, resource exclusion, resource selection and other processes.

Figure 20:
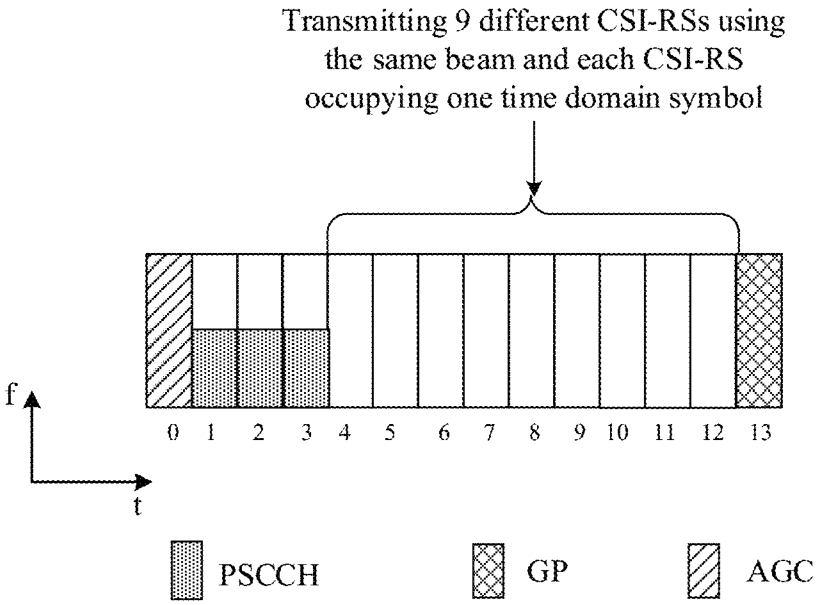
FIG. 20 is a schematic diagram of one CSI-RS occupying one time domain symbol provided by an embodiment of the present disclosure.

Specifically, for example, in the process of determining the optimal spatial domain reception filter of the receiving terminal, the transmitting terminal transmits different CSI-RSs using the same spatial domain transmission filter. Since the transmitting terminal does not switch the spatial domain transmission filter, received power on different time domain symbols will not be different at the receiving terminal. In such case, the transmitting terminal may transmit different CSI-RSs on each symbol. For example, as illustrated in FIG. 20, the transmitting terminal transmits CSI-RSs using the same spatial domain transmission filter, and in such case, each CSI-RS may occupy only one time domain symbol, so at most nine CSI-RSs may be transmitted in one slot in FIG. 20.

In some embodiments, the N time domain symbol(s) does not overlap in time domain with at least one of: a time domain symbol carrying second-stage SCI (that is, the time domain symbol in which the second-stage SCI is located), a time domain symbol carrying a PSCCH, a time domain symbol carrying a PSCCH DMRS, a time domain symbol carrying a PSSCH DMRS, a first symbol configured for sidelink transmission in a slot, a GP symbol in the slot, or a time domain symbol carrying a PSFCH.

For example, when the parameter repetition corresponding to CSI-RS resources is off, the time domain symbols where CSI-RSs are located do not coincide with the time domain symbols where the PSCCH is located.

For example, when the parameter repetition corresponding to CSI-RS resources is off, it means that the transmitting terminal will transmit CSI-RSs with different spatial domain transmission filters. If the symbols carrying the CSI-RSs coincide with the symbols carrying the PSCCH, PSCCH and CSI-RSs may be transmitted with the same spatial domain transmission filter, which may affect reception of PSCCH by other terminals, and then affect resource sensing and resource selection of other terminals.

In some embodiments, in the first slot, a time domain position occupied by a first CSI-RS is located after a last time domain symbol occupied by second-stage SCI.

Figure 21:
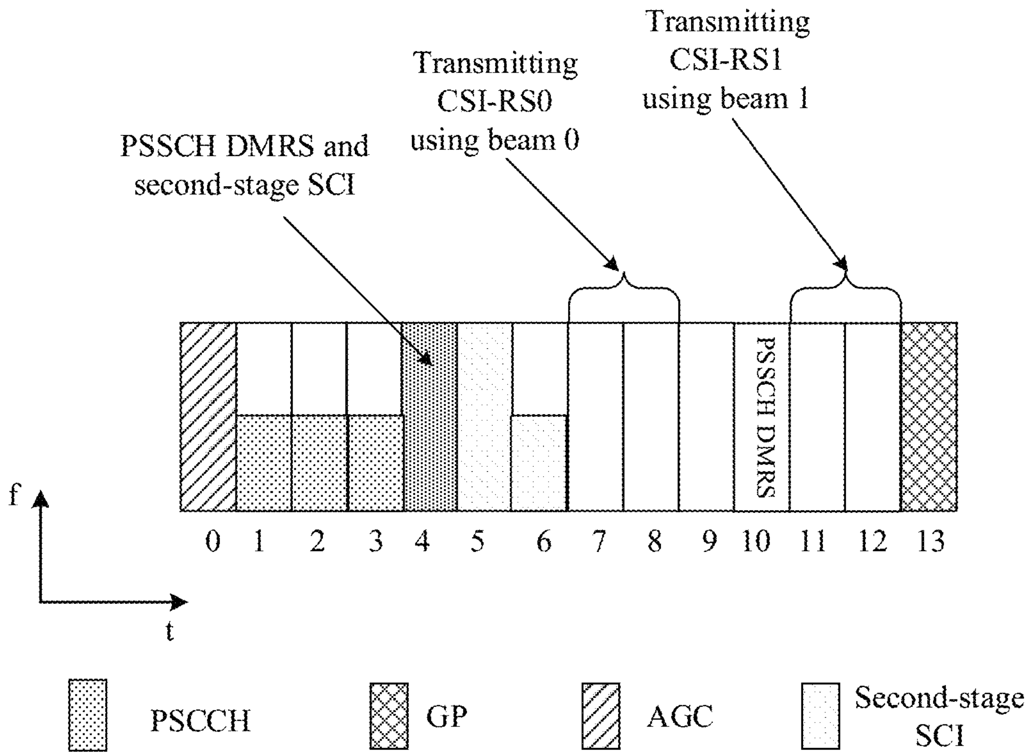
FIG. 21 is a schematic diagram of one CSI-RS occupying two time domain symbols provided by an embodiment of the present disclosure.

Specifically, CSI-RS information transmitted in the current slot is usually indicated by SCI. The first-stage SCI usually carries information for sensing, such as time-frequency resource indication information, priority information, reserved period information and the like of PSSCH, and the second-stage SCI may carry CSI-RS resource indication information. If there is an overlap between a CSI-RS and the second-stage SCI in time domain position, that is, the CSI-RS and the second-stage SCI are transmitted using the same beam, since the optimal beam between the transmitting terminal and the receiving terminal has not been determined at this time, when the second-stage SCI is transmitted using a certain beam, the receiving terminal cannot receive the second-stage SCI correctly, and thus cannot know the CSI-RS information transmitted in the slot. Therefore, in order to avoid this problem, the time domain position occupied by the first CSI-RS may be limited to be after the time domain position occupied by the second-stage SCI, so that different transmission beams may be used for the second-stage SCI and the CSI-RS. For example, the second-stage SCI is transmitted using an omni-directional beam or a wide beam, and the CSI-RS is transmitted using a narrow beam. For example, as illustrated in FIG. 21, a PSCCH occupies time domain symbols 1, 2 and 3, a PSSCH DMRS occupies time domain symbols 4 and 10, second-stage SCI starts mapping from symbol 4 and occupies symbols 4, 5 and 6, a CSI-RS occupies two time domain symbols, and the time domain symbols where the CSI-RS is located do not overlap with the time domain symbols of the PSCCH, second-stage SCI and PSSCH DMRS. In addition, the time domain position of the first CSI-RS is located after the time domain position of the second-stage SCI. In FIG. 21, the first CSI-RS is located at time domain symbols 7 and 8, and the second CSI-RS is located at time domain symbols 11 and 12. CSI-RS 0 may be transmitted with symbols 7 and 8, or the CSI-RS 0 may be transmitted with symbols 8 and 9.

In some embodiments, N time domain symbols occupied by a CSI-RS may coincide with time domain symbols occupied by a PSSCH DMRS. When the resource element in which the CSI-RS is located coincides with the resource unit for the PSSCH DMRS, the CSI-RS is transmitted with a high priority (i.e., the CSI-RS is transmitted preferably).

Usually, when CSI-RSs are transmitted during determination of the transmission beam or the reception beam, normal sidelink data is not transmitted at the same time. This is because the optimal transmission beam and/or reception beam have not been determined at this time, and normal sidelink data transmission is not suitable. In addition, during determination of the beam, different beams may be used for transmission or reception, and it is not suitable to transmit normal side data at this time. Therefore, the PSSCH DMRS is not used for data demodulation. CSI-RS resources may be mapped to the time domain symbols where the PSSCH DMRS is located, and when there is an overlap between the two reference signals, the CSI-RSs are transmitted with a high priority to ensure that the receiving terminal performs measurements according to the CSI-RSs.

In some embodiments, when there is an overlap between time domain symbols occupied by a CSI-RS of the M CSI-RSs and time domain symbols carrying a physical sidelink control channel demodulation reference signal (PSCCH DMRS), the CSI-RS and the PSCCH DMRS are QCL-TypeD.

In some embodiments, when the CSI-RS is transmitted on the time domain symbols carrying the PSCCH DMRS, the CSI-RS and the PSCCH DMRS are QCL-TypeD.

In some embodiments, when there is an overlap between time domain symbols carrying a PSCCH DMRS and time domain symbols occupied by a CSI-RS of the M CSI-RSs, the PSCCH DMRS is transmitted with a high priority; or, when there is an overlap between time domain symbols carrying a PSCCH and the time domain symbols occupied by the CSI-RS, the PSCCH is transmitted with a high priority; or, when the PSCCH DMRS and the CSI-RS occupy a same resource element (RE), the PSCCH DMRS is transmitted with a high priority; or, when the PSCCH and the CSI-RS occupy a same RE, the PSCCH is transmitted with a high priority.

In some embodiments, when there is an overlap between time domain symbols occupied by a CSI-RS of the M CSI-RSs and time domain symbols carrying second-stage SCI, the CSI-RS and the second-stage SCI are QCL-TypeD.

In some embodiments, when the CSI-RS is transmitted on the time domain symbols carrying the second-stage SCI, the CSI-RS and the second-stage SCI are QCL-TypeD.

In some embodiments, when there is an overlap between time domain symbols carrying second-stage SCI and time domain symbols occupied by a CSI-RS of the M CSI-RSs, the second-stage SCI is transmitted with a high priority; or, when the second-stage SCI and the CSI-RS occupy a same RE, the second-stage SCI is transmitted with a high priority.

In some embodiments, when there is an overlap between time domain symbols occupied by a CSI-RS of the M CSI-RSs and time domain symbols carrying a PSSCH DMRS, the CSI-RS and the PSSCH DMRS are QCL-TypeD.

In some embodiments, when the CSI-RS is transmitted on the time domain symbols carrying the PSSCH DMRS, the CSI-RS and the PSSCH DMRS are QCL-TypeD.

In some embodiments, when there is an overlap between time domain symbols carrying a PSSCH DMRS and time domain symbols occupied by a CSI-RS of the M CSI-RSs, the PSSCH DMRS is transmitted with a high priority; or, when the PSSCH DMRS and the CSI-RS occupy a same RE, the PSSCH DMRS is transmitted with a high priority.

In some embodiments, a measurement result of PSCCH-reference signal received power (RSRP) is used in at least one of a sensing process, a resource selection process, or a process of determining a candidate transmission resource set in a case that one of the following conditions is satisfied:

a CSI-RS resource configuration includes CSI-RS resources or a CSI-RS resource set for selecting a spatial domain transmission filter;

the CSI-RS resource configuration includes CSI-RS resources or a CSI-RS resource set for selecting a spatial domain reception filter;

the CSI-RS resource configuration includes CSI-RS resources or a CSI-RS resource set in which a repetition field takes a first value, where the first value is configured for indicating that the first terminal device transmits the CSI-RSs without using a same spatial domain transmission filter;

the CSI-RS resource configuration includes CSI-RS resources or a CSI-RS resource set in which a repetition field takes a second value, where the second value is configured for indicating that the first terminal device transmits the CSI-RSs using the same spatial domain transmission filter;

a channel state information (CSI) report quantity in the CSI-RS resource configuration is one of the following: CSI-RS resource indicator (CRI), CRI and RSRP ('cri-RSRP'), CRI and signal to interference plus noise ratio ('cri-SINR'), no reporting or none;

transmission of the CSI-RS resources in one slot using a plurality of spatial domain transmission filters is supported;

the CSI-RS resources and a PSSCH DMRS are allowed to be transmitted in a same time domain symbol;

there is an overlap between the CSI-RS resources and the PSSCH DMRS in a time domain.

In some embodiments, resource pool configuration information or BandWidth Part (BWP) configuration information includes configuration information for configuring CSI-RS resources, or sidelink configuration information transmitted from the transmitting terminal to the receiving terminal (e.g., through the PC5-RRC signaling) includes CSI-RS resource configuration information, or sidelink configuration information transmitted from the receiving terminal to the transmitting terminal includes CSI-RS resource configuration information.

In some embodiments, no valid sidelink data is transmitted in the first slot.

In some embodiments, a PSSCH transmitted together with the M CSI-RSs includes at least one of redundant information or padding bits.

Specifically, when CSI-RSs are transmitted during determination of the transmission beam or the reception beam, normal sidelink data is not transmitted at the same time. This is because the optimal transmission beam and/or reception beam have not been determined at this time, and normal sidelink data transmission is not suitable. In addition, during determination of the beam, different beams may be used for transmission or reception, and it is not suitable to transmit normal side data at this time.

In some embodiments, the first terminal device determines CSI-RS resources or a CSI-RS resource set corresponding to the M CSI-RSs according to resource pool configuration information or sidelink bandwidth part (BWP) configuration information.

In some embodiments, the resource pool configuration information or sidelink BWP configuration information includes CSI-RS resource set (CSI-RS-ResourceSet) configuration information and/or CSI report configuration information.

In some embodiments, the CSI-RS resource set configuration information includes one or more of the following parameters:

CSI-RS resource set identifier (CSI-RS-ResourceSetId);

configuration information of CSI-RS resources (CSI-RS-Resource);

configuration information of a parameter repetition, for example, the value is off or on;

the number of time domain symbols occupied by a CSI-RS resource;

indication information for determining the time domain symbol in which the first CSI-RS resource is located, for example indicating through a time domain symbol index in a slot;

indication information for determining a RE or subcarrier carrying a CSI-RS resource in a PRB, for example, indicating the position of the RE carrying the first CSI-RS in the PRB in the form of a bitmap by a parameter sidelink CSI-RS frequency allocation (sl-CSI-RS-FreqAllocation).

When the transmitting terminal transmits to the receiving terminal indication information indicating that CSI-RS resources in the CSI-RS resource set with repetition of off are to be transmitted, the receiving terminal may assume that the transmitting terminal does not transmit the CSI-RS resources using the same transmission beam. Therefore, the receiving terminal may perform measurements based on the CSI-RSs and perform CSI report or feedback to the transmitting terminal, so that the first terminal device can determine a spatial domain transmission filter based on the CSI report or feedback.

When the transmitting terminal indicates the receiving terminal that CSI-RS resources in the CSI-RS resource set with repetition being on are transmitted, the receiving terminal may assume that the transmitting terminal transmits the CSI-RS resources using the same transmission beam. Therefore, the receiving terminal may receive the CSI-RSs using different reception beams, measure the CSI-RSs, and determine the reception beam according to the measurement results.

In some embodiments, the resource pool configuration information or the sidelink BWP configuration information includes a first CSI-RS resource set with at least one parameter repetition set as off and/or a second CSI-RS resource set with at least one parameter repetition set as on. The first CSI-RS resource set is used to determine a spatial domain transmission filter, and the second CSI-RS resource set is used to determine a spatial domain reception filter.

For example, two CSI-RS resource sets are configured, the parameter repetition in one resource set is off, and the parameter repetition in the other resource set is on. When a transmission beam is determined, the CSI-RS resource set with repetition being off is used. In such case, the transmitting terminal uses different transmission beams to transmit CSI-RS resources in the CSI-RS resource set respectively, the receiving terminal measures the CSI-RS resources respectively and feeds back a CSI-RS resource index, and the transmitting terminal may determine the corresponding transmission beam according to the index. When a reception beam is determined, the CSI-RS resource set with repetition being on is used. In such case, the transmitting terminal uses the same transmission beam to transmit the CSI-RS resources in the CSI-RS resource set, and the receiving terminal uses different reception beams respectively for reception, and measures RSRP for the CSI-RSs, and selects the optimal reception beam according to the measurement results.

In some embodiments, the resource pool configuration information or sidelink BWP configuration information further includes one or more of the following parameters: the number of antenna ports, for example, indicating that the number of CSI-RS antenna ports is {1, 2, 4, 8}, etc.; or, CSI-RS density.

In some embodiments, the CSI-RS density is used to indicate the number of REs occupied by a CSI-RS of each antenna port within each PRB. If the density is 2, it indicates that the CSI-RS of each antenna port within each PRB occupies 2 REs.

In some embodiments, when the CSI-RS density is less than 1, the resource pool configuration information or sidelink BWP configuration information may also include PRB information for indicating mapping of CSI-RS resources. For example, when the density is 0.5, that is, when each antenna port in every two PRBs occupies one RE, the resource pool configuration information or sidelink BWP configuration information may also include PRB information mapping one CSI-RS resource in every two PRBs, such as mapping CSI-RS resources on odd (or even) PRBs.

In some embodiments of the present disclosure, the purpose of a CSI-RS resource set may be indicated by the value of the repetition field of the CSI-RS resource set, for example, indicating that the CSI-RS resource set is used for determining a target transmission beam or for determining a target reception beam.

In some embodiments of the present disclosure, the purpose of a CSI-RS resource set may be indicated by an index of the CSI-RS resource set, for example, indicating that the CSI-RS resource set is used for determining a target transmission beam or for determining a target reception beam. The configuration information of the CSI-RS resource set includes index information of the CSI-RS resource set and the repetition field. The index of the CSI-RS resource set may be used to determine a corresponding CSI-RS resource set, and further, the value of the repetition field in the CSI-RS resource set may be determined.

For example, when determining the target transmission beam, the transmitting terminal may use the CSI-RS resource set with repetition being off, and when determining the target reception beam, the transmitting terminal may use the CSI-RS resource set with repetition being on.

In some embodiments, the resource pool configuration information or sidelink BWP configuration information includes configuration information of a first CSI-RS resource set and configuration information of a second CSI-RS resource set. The repetition of the first CSI-RS resource set is off, and the repetition of the second CSI-RS resource set is on.

When the target transmission beam needs to be determined, the first terminal device indicates an index of the first CSI-RS resource set, or indicates use of the first CSI-RS resource set. For example, the first terminal device may transmit M1 CSI-RS resources in the first CSI-RS resource set respectively using different transmission beams, the second terminal device measures the received CSI-RS resources respectively, and performs CSI report or feedback according to the measurement results, and the first terminal device selects the target transmission beam according to the CSI report or feedback from the second terminal device.

When a reception beam is determined, the first terminal device indicates an index of the second CSI-RS resource set, or indicates use of the second CSI-RS resource set. For example, the first terminal device transmits M2 CSI-RS resources in the second CSI-RS resource set respectively using the same transmission beam, and the second terminal device receives the CSI-RS resources respectively using different reception beams, measures the CSI-RS resources, and selects the target reception beam according to the measurement results.

In other embodiments of the present disclosure, the purpose of a CSI-RS resource set may be indicated by a CSI report quantity configuration corresponding to the CSI-RS resource set, for example, indicating that the CSI-RS resource set is used for determining a target transmission beam or for determining a target reception beam. For example, when determining the target transmission beam, the transmitting terminal uses a CSI-RS resource set with a CSI report quantity not being 'none', and when determining the target reception beam, the transmitting terminal uses a CSI-RS resource set with a CSI report quantity being 'none'.

For example, the resource pool configuration information or sidelink BWP configuration information configures two CSI-RS resource sets, and configures CSI report quantity associated with each CSI-RS resource set. The CSI report quantity associated with the first CSI-RS resource set is 'cri-RSRP', and the CSI report quantity associated with the second CSI-RS resource set is 'none'.

Then, when the first terminal device indicates to the second terminal device that the CSI report quantity is 'cri-RSRP', indicating that the first terminal device will transmit CSI-RS resources in the first CSI-RS resource set, and in such case, the second terminal device may assume that the first terminal device uses different transmission beams to transmit the CSI-RS resources. Therefore, the second terminal device measures the CSI-RS resources and performs CSI report or feedback, so that the first terminal device may determine the target transmission beam according to the CSI report or feedback.

When the first terminal device indicates to the second terminal device that the CSI report quantity is 'none', indicating that the first terminal device will transmit CSI-RS resources in the second CSI-RS resource set, and in such case, the second terminal device may assume that the first terminal device uses the same transmission beam to transmit the CSI-RS resources. Therefore, the second terminal device may use different reception beams to receive the CSI-RS resources respectively, measure the CSI-RS resources, and select the target reception beam according to the measurement results.

In the embodiments of the present disclosure, both the first terminal device and the second terminal device may obtain the resource pool configuration information or the sidelink BWP configuration information. That is, the first terminal device and the second terminal device have the same understanding of the CSI-RS resource configuration information.

In some embodiments, the resource pool configuration information or sidelink BWP configuration information includes CSI report configuration information (e.g., CSI-ReportConfig). The CSI report configuration information is used to configure a report quantity (reportQuantity) (or feedback type), and the report quantity (or feedback type) includes, for example, 'cri-RSRP', 'cri-SINR', or 'none'.

Specifically, for example, the resource pool configuration information configures two CSI-RS resource sets, and configures a CSI report quantity associated with each of the CSI-RS resource sets, in which the CSI report quantity associated with the first CSI-RS resource set is 'cri-RSRP', and the CSI report quantity associated with the second CSI-RS resource set is 'none'. When the transmitting terminal transmits to the receiving terminal indication information indicating that the CSI report quantity is 'cri-RSRP', indicating that the transmitting terminal will transmit CSI-RS resources in the first CSI-RS resource set, and in such case, the receiving terminal may assume that the transmitting terminal uses different spatial domain transmission filters to transmit the CSI-RS resources. Therefore, the receiving terminal may perform measurements according to the CSI-RSs and feedback the preferred CSI-RS resource index and/or measurement results, so that the transmitting terminal determines the preferred spatial domain transmission filter for the transmitting side. When the transmitting terminal transmits to the receiving terminal indication information indicating that the CSI report quantity is 'none', indicating that the transmitting terminal will transmit CSI-RS resources in the second CSI-RS resource set, and in such case, the receiving terminal may assume that the transmitting terminal uses the same spatial domain transmission filter to transmit the CSI-RSs. Therefore, the receiving terminal may use different receiving-side spatial domain transmission filters to receive the CSI-RSs respectively, measure the CSI-RSs, and select the optimal receiving-side spatial domain transmission filter according to the measurement results, thus realizing selection of the receiving-side spatial domain transmission filter.

In some embodiments, a CSI-RS resource set or resources in the CSI-RS resource set are associated with a report quantity.

For example, a plurality of CSI-RS resource sets (CSI-RS-ResourceSet) are configured in the resource pool configuration information, and each resource set configuration information includes CSI-RS resource set identifier (CSI-RS-ResourceSetId), configuration information of CSI-RS resources (CSI-RS-Resource), and configuration information of a parameter repetition. In addition, a plurality of CSI report configuration information is also configured in the resource pool configuration information, each CSI report configuration information includes parameters such as CSI report configuration identifier (CSI-ReportConfigId) and a report quantity, and further, the CSI report configuration information includes CSI-RS resource set identifier (CSI-RS-ResourceSetId), or the CSI-RS resource set configuration information includes CSI report configuration identifier, so that the CSI-RS resource set and CSI report quantity may be associated.

In some embodiments, the resource pool configuration information or the sidelink BWP configuration information includes a number N of time domain symbols occupied by a CSI-RS, where N is an integer greater than or equal to 1.

It should be understood that the N time domain symbols include the number of time domain symbols N1 for transmitting CSI-RS resources, and/or a symbol for AGC, and/or a symbol for GP. The data on the symbol for AGC is the same as the data on the first time domain symbol carrying the CSI-RS resources. For example, a CSI-RS resource in the first CSI-RS resource set occupies two time domain symbols, including a symbol for AGC and a symbol for carrying the CSI-RS resource. A CSI-RS resource in the second CSI-RS resource set occupies one time domain symbol, that is, only the symbol carrying the CSI-RS resource is included, and the symbol for AGC is not included.

In some embodiments, the resource pool configuration information or the sidelink BWP configuration information includes indication information for determining the time domain symbol where the first CSI-RS resource is located, which is represented by a time domain symbol index in the slot. For example, with respect to FIG. 15, a time domain symbol where the first CSI-RS resource is located is a time domain symbol corresponding to the symbol index 4, so the indication information indicates the time domain symbol index 4. Similarly, with respect to FIG. 16, the indication information indicates the time domain symbol index 3. With respect to FIG. 21, the indication information indicates the time domain symbol index 7.

In some embodiments, the resource pool configuration information or the sidelink BWP configuration information includes indication information for determining a RE or subcarrier within a PRB where the CSI-RS resource is located. For example, the position of the RE carrying the first CSI-RS within the PRB is indicated in the form of a bitmap by the parameter sl-CSI-RS-FreqAllocation.

In some embodiments, the resource pool configuration information or sidelink BWP configuration information includes at least one of the following:

- indication information for indicating whether a PSSCH DMRS and CSI-RS resources are allowed to overlap in time domain;
- indication information for indicating whether a PSSCH or PSSCH DMRS and CSI-RS resources are allowed to overlap in time domain;
- indication information for indicating whether the second-stage SCI and CSI-RS resources are allowed to overlap in time domain;
- a first threshold for defining a received power difference caused when CSI-RS resources are transmitted using different spatial domain transmission filters in one slot;
- a maximum number of CSI-RS resources allowed to be transmitted in a slot;
- a minimum number of CSI-RS resources allowed to be transmitted in a slot.

In some embodiments, the first terminal device transmits first indication information to the second terminal device.

The first indication information is configured for indicating that the CSI-RSs transmitted by the first terminal device are configured for selecting a spatial domain transmission filter for the first terminal device to transmit sidelink data; or the first indication information is configured for indicating that the CSI-RSs transmitted by the first terminal device are configured for selecting a spatial domain reception filter for the second terminal device to receive sidelink data; or the first indication information is configured for indicating that the CSI-RSs transmitted by the first terminal device are configured for measuring channel state information.

In some embodiments, the channel state information may include, but is not limited to, at least one of the following: a Channel Quality Indicator (CQI), a Rank Indication (RI), or a Precoding Matrix Indicator (PMI).

In some embodiments, the first indication information is carried by one of the following: PC5-RRC signaling, SCI, a Media Access Control Control Element (MAC CE), and sidelink feedback information.

In some embodiments, when the first indication information is carried by the SCI or the MAC CE, the first terminal device indicates to activate sidelink feedback.

In some embodiments, the first terminal device transmits first sidelink configuration information to the second terminal device.

The first sidelink configuration information includes at least one of the following: indexes of CSI-RS resources corresponding to the M CSI-RSs, an index of a CSI-RS resource set corresponding to the M CSI-RSs, a correspondence between the CSI-RS resource set corresponding to the M CSI-RSs and a CSI report quantity, a number of CSI-RS resources included in the CSI-RS resource set corresponding to the M CSI-RSs, a value of M, a value of N, indication information for indicating time domain symbols occupied by a first CSI-RS in the M CSI-RSs, indication information for determining a RE or subcarrier carrying a CSI-RS in a PRB, a density of a CSI-RS, indication information for indicating whether a PSSCH DMRS and a CSI-RS are allowed to overlap in time domain, indication information for indicating whether a PSCCH and CSI-RS resources are allowed to overlap in time domain, indication information for indicating whether second-stage SCI and the CSI-RS resources are allowed to overlap in time domain, a number of CSI-RS resources reported or fed back by the second terminal device to the first terminal device, a maximum number of CSI-RSs allowed to be transmitted in a slot, a minimum number of CSI-RSs allowed to be transmitted in a slot, or a value of a repetition field corresponding to configuration information of the CSI-RS resources or the CSI-RS resource set corresponding to the M CSI-RSs.

The repetition field corresponding to the configuration information of the CSI-RS resources or the CSI-RS resource set corresponding to the M CSI-RSs takes a first value, indicating that the first terminal device transmits the CSI-RSs without using a same spatial domain transmission filter, and the repetition field corresponding to the configuration information of the CSI-RS resources or the CSI-RS resource set corresponding to the M CSI-RSs takes a second value, indicating that the first terminal device transmits the CSI-RSs using the same spatial domain transmission filter.

In some embodiments, the CSI report quantity includes at least one of the following: a CRI, a CRI and RSRP ('cri-RSRP'), a CRI and signal to interference plus noise ratio ('cri-SINR'), no reporting or none.

In some embodiments, the CRI may be resource indexes of CSI-RS resources.

In some embodiments, the first sidelink configuration information is carried by one of the following: SCI, an MAC CE, and PC5-RRC signaling.

In some embodiments, when the first sidelink configuration information is carried by the SCI or the MAC CE, the first terminal device indicates to activate sidelink feedback.

It should be understood that the contents indicated by the first sidelink configuration information may be transmitted by the same message or signaling, or may be transmitted by different messages or signaling, which is not limited in the disclosure.

It should be noted that when the contents indicated by the first sidelink configuration information are transmitted by different signaling, the present disclosure does not limit the transmission order of the signaling.

It should be noted that when the contents indicated by the first sidelink configuration information are transmitted by different signaling, the present disclosure does not limit the type of the signaling. For example, the first sidelink configuration information is transmitted by two signaling, where the first signaling is PC5-RRC signaling and the second signaling is SCI; or, the signaling both are PC5-RRC signaling.

In some embodiments, when the first terminal device transmits the CSI-RSs to the second terminal device in the first slot using the at least one spatial domain transmission filter, the first terminal device carries CSI-RS resource indication information corresponding to the CSI-RSs in SCI in the first slot.

For example, the SCI in the first slot is SCI associated with the CSI-RS. The SCI includes first-stage SCI and second-stage SCI.

In some embodiments, the SCI may also be replaced by other signaling. For example, the first terminal device carries CSI-RS resource indication information corresponding to the CSI-RS in the MAC CE or PC5-RRC.

In some embodiments, the CSI-RS resource indication information corresponding to the CSI-RS is configured for indicating at least one of a CSI-RS resource index corresponding to a first CSI-RS transmitted in the first slot or a number of the CSI-RSs transmitted in the first slot.

In some embodiments, the SCI in the first slot includes a bitmap, and the bitmap indicates at least one of a CSI-RS resource index corresponding to the first CSI-RS transmitted in the first slot or a number of the CSI-RSs transmitted in the first slot.

In some embodiments, the SCI in the first slot includes resource index information of the first CSI-RS transmitted in the first slot and information on a number of the CSI-RSs transmitted in the first slot.

In some embodiments, the SCI in the first slot includes resource index information of the first CSI-RS transmitted in the first slot.

In some embodiments, indexes of CSI-RS resources corresponding to the plurality of CSI-RSs transmitted in the first slot are ordered sequentially from an index of the first CSI-RS resource.

In some embodiments, the number of the CSI-RSs transmitted in the first slot is determined according to at least one of the following: a number of time domain symbols available for sidelink transmission in the first slot, a number of time domain symbols occupied by a PSCCH in the first slot, a number of time domain symbols occupied by a PSSCH DMRS in the first slot, a number of time domain symbols occupied by each CSI-RS resource in the first slot, or information regarding whether a PSFCH transmission resource is included in the first slot.

In some embodiments, the first terminal device transmits second indication information to the second terminal device, and the second indication information is configured for indicating CSI-RS resource set information corresponding to the M CSI-RSs.

Since a plurality of CSI-RSs are transmitted in a slot, it is necessary to indicate the plurality of CSI-RSs transmitted in the slot through SCI. In an embodiment, the CSI-RSs transmitted in a slot may be indicated in the following manner.

In the first mode, the SCI indicates an index of the first CSI-RS resource transmitted in the slot and the number of CSI-RS resources transmitted in the slot, the CSI-RSs included in the slot are ordered sequentially from the index of the first CSI-RS resource. For example, if the index of the first CSI-RS resource is 0 and the number of CSI-RS resources transmitted in the slot is 4, respective indexes of the CSI-RS resources are 0/1/2/3.

In the second mode, the SCI indicates an index of the first CSI-RS resource transmitted in the slot, and the number of CSI-RS resources included in the slot is determined based on the number of time domain symbols available for sidelink transmission in the slot, the number of time domain symbols occupied by the PSCCH, the number of time domain symbols occupied by each CSI-RS resource, and the like.

In the third mode, the SCI includes a bitmap, and a length of the bitmap corresponds to the number of CSI-RS resources included in the CSI-RS resource set. For example, if the CSI-RS resource set includes 8 CSI-RS resources, the CSI-RS information transmitted in the current slot is indicated by an 8-bit bitmap, where the lowest bit of the bitmap corresponds to the lowest CSI-RS resource index and the highest bit of the bitmap corresponds to the highest CSI-RS resource index. A bit with a value of 1 in the bitmap indicates that the CSI-RS resource corresponding to the bit is transmitted in the current slot, otherwise, the CSI-RS resource is not transmitted. If the bitmap is 00001111, it indicates that CSI-RS resources with resource indexes of 0/1/2/3 are transmitted in the current slot. If the bitmap is 00110011, it indicates that CSI-RS resources with resource indexes of 0/1/4/5 are transmitted in the current slot. If the bitmap is 00010100, it indicates that CSI-RS resources with resource indexes of 2/4 are transmitted in the current slot.

In some embodiments, frequency domain resources occupied by the M CSI-RSs do not exceed frequency domain resources of a PSSCH transmitted together with the M CSI-RSs. That is, the CSI-RSs may only be transmitted in the frequency domain resources of the PSSCH, and will not exceed the frequency domain resources corresponding to the PSSCH.

In some embodiments, the SCI in the first slot carries information indicating frequency domain resources occupied by the CSI-RSs.

In some embodiments, in the first slot, part or all of a PSCCH DMRS, second-stage SCI and a PSSCH DMRS are transmitted using a same spatial domain transmission filter; or, in the first slot, part or all of the PSCCH DMRS, the second-stage SCI and the PSSCH DMRS have a QCL-TypeD relationship.

Therefore, in the embodiments of the present disclosure, the first terminal device transmits M CSI-RSs to the second terminal device in the first slot by using the at least one spatial domain transmission filter, and M>1, that is, the first terminal device can transmit a plurality of CSI-RSs in one slot, so that the delay of transmitting the plurality of CSI-RSs can be reduced compared with transmitting one CSI-RS in one slot, and the spatial domain transmission filter and the spatial domain reception filter can be selected quickly, the delay of the spatial domain filter selection process can be reduced, and the resource utilization can be improved. Further, an optimal spatial domain transmission filter for the first terminal device may be selected based on the CSI-RSs transmitted by the first terminal device, or an optimal spatial domain reception filter for the second terminal device may be selected based on the CSI-RSs transmitted by the first terminal device.

In some embodiments, the transmitting terminal transmits a CSI-RS resource in a slot, and the CSI-RS and PSSCH are transmitted together. That is, the CSI-RS resource transmitted by the PSSCH is a slot-level CSI-RS resource.

In some embodiments, frequency domain resources occupied by the CSI-RS do not exceed the frequency domain resources of the PSSCH, that is, the CSI-RS may only be transmitted in the frequency domain resources of the PSSCH, and will not exceed the frequency domain resources corresponding to the PSSCH.

In some embodiments, when the transmitting terminal transmits CSI-RS resources to the receiving terminal, the transmitting terminal needs to inform the receiving terminal of resource information corresponding to the CSI-RS resources currently transmitted each time, to enable the receiving terminal to determine the time-frequency positions of the currently received CSI-RS resources according to the CSI-RS resource information and perform corresponding measurements. The method for indicating CSI-RS resource information from a transmitting terminal to a receiving terminal includes the following manners.

Figure 22:
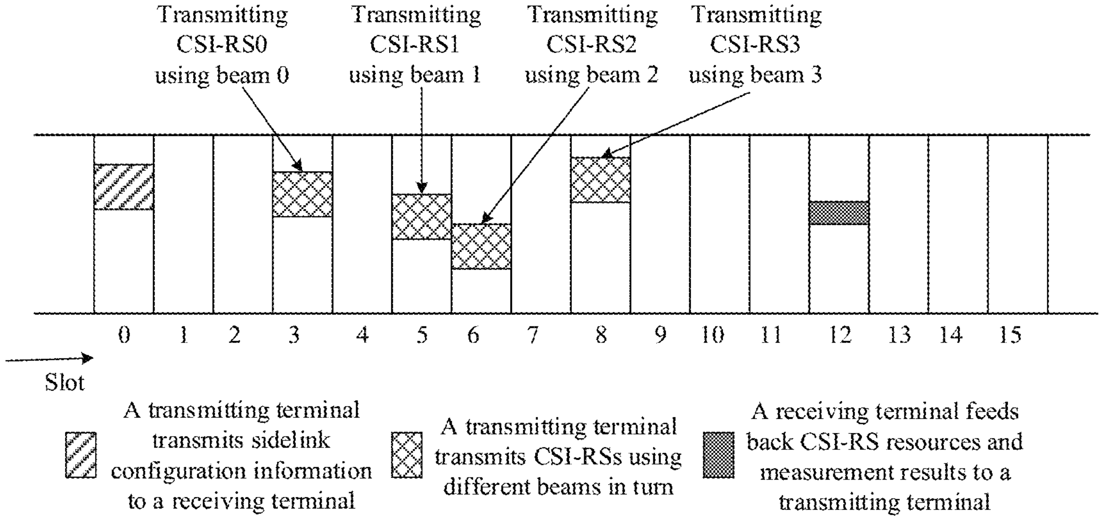
FIG. 22 and FIG. 23 are schematic diagrams of one CSI-RS occupying one slot provided by embodiments of the present disclosure.

In the fourth mode, when the transmitting terminal transmits CSI-RS resources, CSI-RS resource identity information is carried in the SCI associated with the CSI-RSs. For example, in the process of determining the optimal transmission beam of the transmitting terminal, the transmitting terminal transmits different CSI-RS resources using different beams or spatial domain transmission filters in turn, the CSI-RSs and PSSCH are transmitted simultaneously, and the resource identifiers of the CSI-RSs transmitted in the current slot are indicated in the associated PSCCH or SCI (including the first-stage SCI or the second-stage SCI). As illustrated in FIG. 22, the transmitting terminal transmits different CSI-RS resources in slots 3/5/6/8, respectively, and indicates the resource identifiers of the CSI-RSs transmitted in the current slot in SCI (including the first-stage SCI or the second-stage SCI) in each slot.

In the fifth mode, the transmitting terminal transmits indication information to the receiving terminal for indicating one of the following information: transmission resource indication information of the first CSI-RS transmitted by the transmitting terminal and the number of transmitted CSI-RS resources; and a transmission resource indication information identifier of each CSI-RS transmitted by the transmitting terminal. In some embodiments, the transmission resource indication information of the CSI-RS is used to indicate the slot in which the CSI-RS is transmitted. In the process of determining the optimal reception beam of the receiving terminal, the transmitting terminal uses the same beam or spatial domain transmission filter to transmit different CSI-RS resources, and the receiving terminal uses different beams or spatial domain transmission filters to receive the CSI-RS resources transmitted by the transmitting terminal respectively. In this process, the transmitting terminal needs to let the receiving terminal know in advance on which slots or transmission resources the transmitting terminal will transmit the CSI-RS resources, so that the receiving terminal may use the corresponding reception beams for reception. Therefore, the transmitting terminal transmits indication information to the receiving terminal for indicating CSI-RS transmission resources used by the transmitting terminal to transmit the CSI-RSs.

Figure 23:
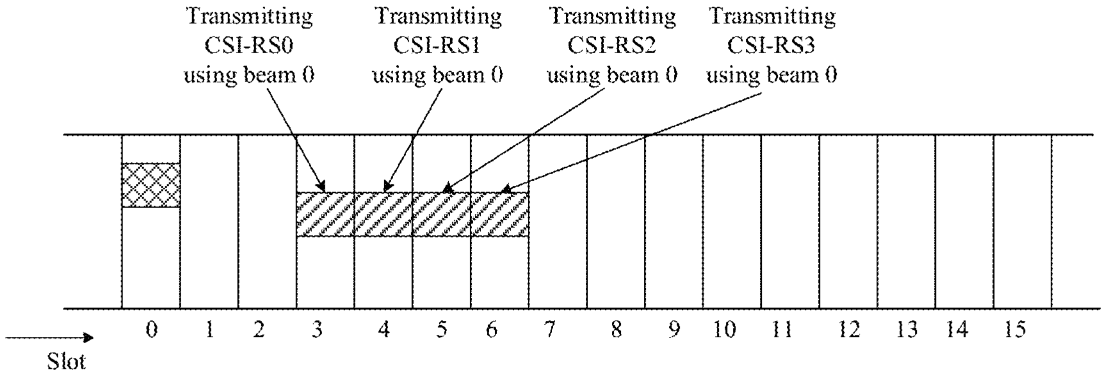

As illustrated in FIG. 23, the transmitting terminal transmits indication information to the receiving terminal in slot 0 for indicating that the slots 3/4/5/6 are slots for transmitting CSI-RS resources by the transmitting terminal. Meanwhile, the indication information indicates an identifier of the first CSI-RS resource (namely CSI-RS resource identifier 0) and the number 4 of CSI-RS resources to be transmitted. According to the indication information, the receiving terminal may determine that the CSI-RS resource identifiers transmitted by the transmitting terminal on the slots 3/4/5/6 are 0/1/2/3, respectively.

In the embodiments, in the slot carrying the CSI-RSs, CSI-RS resources may be determined based on a sidelink CSI-RS first symbol parameter (sl-CSI-RS-FirstSymbol) and a sidelink CSI-RS frequency domain allocation parameter (sl-CSI-RS-FreqAllocation).

The method embodiments of the present disclosure have been described in detail above with reference to FIG. 14 to FIG. 23, and the apparatus embodiments of the present disclosure will be described in detail below with reference to FIG. 24 to FIG. 25. It should be understood that the apparatus embodiments and the method embodiments correspond to each other, and similar descriptions may refer to the method embodiments.

Figure 24:
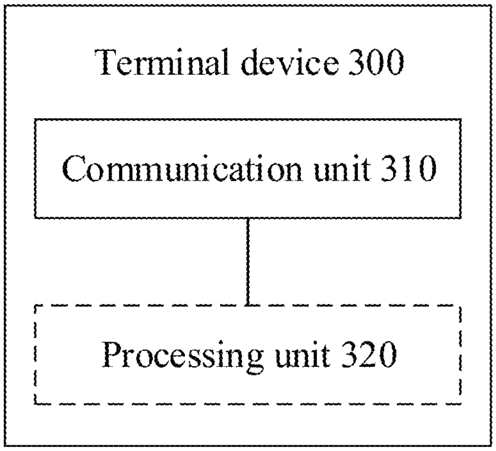
FIG. 24 is a schematic block diagram of a terminal device provided by an embodiment of the present disclosure.
Figure 25:
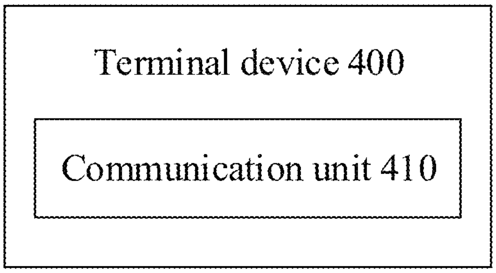
FIG. 25 is a schematic block diagram of another terminal device provided by an embodiment of the present disclosure.

FIG. 24 illustrates a schematic block diagram of a terminal device 300 according to an embodiment of the present disclosure. The terminal device 300 is a first terminal device, and as illustrated in FIG. 24, the terminal device 300 includes a communication unit 310.

The communication unit 310 is configured to transmit M CSI-RSs to a second terminal device in a first slot using at least one spatial domain transmission filter.

The M CSI-RSs are configured for selecting a target spatial domain transmission filter, or the M CSI-RSs are configured for selecting a target spatial domain reception filter, and each of the M CSI-RSs occupies N time domain symbol(s), M and N are positive integers, and M>1.

In some embodiments, in a case that the M CSI-RSs are configured for selecting the target spatial domain transmission filter, a repetition field in configuration information of CSI-RS resources or a CSI-RS resource set corresponding to the M CSI-RSs takes a first value, and the first value is configured for indicating that the first terminal device transmits the CSI-RSs without using a same spatial domain transmission filter; and in a case that the M CSI-RSs are configured for selecting the target spatial domain reception filter, the repetition field in the configuration information of the CSI-RS resources or the CSI-RS resource set corresponding to the M CSI-RSs takes a second value, and the second value is configured for indicating that the first terminal device transmits the CSI-RSs using the same spatial domain transmission filter.

In some embodiments, the terminal device 300 further includes a processing unit 320.

The processing unit 320 is configured to determine CSI-RS resources or a CSI-RS resource set corresponding to the M CSI-RSs according to resource pool configuration information or sidelink bandwidth part configuration information.

In some embodiments, the communication unit 310 is further configured to transmit first indication information to the second terminal device.

The first indication information is configured for indicating that the CSI-RSs transmitted by the first terminal device are configured for selecting a spatial domain transmission filter for the first terminal device to transmit sidelink data; or the first indication information is configured for indicating that the CSI-RSs transmitted by the first terminal device are configured for selecting a spatial domain reception filter for the second terminal device to receive the sidelink data; or the first indication information is configured for indicating that the CSI-RSs transmitted by the first terminal device are configured for measuring channel state information.

In some embodiments, in a case that the M CSI-RSs are configured for selecting the target spatial domain transmission filter, N≥2.

In some embodiments, the N time domain symbols include a first time domain symbol and a second time domain symbol. Data on the first time domain symbol is the same as data on the second time domain symbol, or the data on the first time domain symbol is duplication of the data on the second time domain symbol.

In some embodiments, the first time domain symbol is a first one in the N time domain symbols, and the second time domain symbol is a time domain symbol except the first time domain symbol in the N time domain symbols.

In some embodiments, the N time domain symbols further include a third time domain symbol, and the third time domain symbol is a GP symbol.

In some embodiments, the N time domain symbols include a fourth time domain symbol, and data on the fourth time domain symbol is mapped in a comb form.

In some embodiments, the first slot does not coincide with a slot in which a sidelink transmission is located, and the slot in which the sidelink transmission is located is a slot in which the first terminal device transmits sidelink data to other terminal devices using a first spatial domain transmission filter.

In some embodiments, in a case that the M CSI-RSs are configured for selecting the target spatial domain transmission filter, a difference between received power corresponding to any two of the M CSI-RSs is less than a first threshold.

In some embodiments, in a case that the M CSI-RSs are configured for selecting the target spatial domain transmission filter, a difference between received power corresponding to a first CSI-RS in the M CSI-RSs and received power corresponding to a CSI-RS of other M−1 CSI-RS(s) is less than a first threshold.

In some embodiments, in a case that the M CSI-RSs are configured for selecting the target spatial domain transmission filter, a difference between received power corresponding to any one of the M CSI-RSs and received power corresponding to a PSCCH in the first slot is less than a first threshold.

In some embodiments, N=1.

In some embodiments, the first threshold is agreed in protocol or pre-configured, or the first threshold is configured by a network device, or the first threshold is configured by the first terminal device.

In some embodiments, the at least one spatial domain transmission filter corresponding to the M CSI-RSs is different from a spatial domain transmission filter corresponding to a PSCCH.

In some embodiments, in a case that the M CSI-RSs are configured for selecting the target spatial domain reception filter, N≥1.

In some embodiments, the at least one spatial domain transmission filter corresponding to the M CSI-RSs is different from a spatial domain transmission filter corresponding to a PSCCH, or the at least one spatial domain transmission filter corresponding to the M CSI-RSs is the same as the spatial domain transmission filter corresponding to the PSCCH.

In some embodiments, the N time domain symbol(s) does not overlap in a time domain with at least one of: a time domain symbol carrying second-stage SCI, a time domain symbol carrying a PSCCH, a time domain symbol carrying a PSSCH DMRS, a first symbol configured for sidelink transmission in a slot, a GP symbol in the slot, or a time domain symbol carrying a PSFCH.

In some embodiments, in the first slot, a time domain position occupied by a first CSI-RS is located after a last time domain symbol occupied by second-stage SCI.

In some embodiments, in a case that there is an overlap between time domain symbols occupied by a CSI-RS of the M CSI-RSs and time domain symbols carrying a PSCCH DMRS, the CSI-RS and the PSCCH DMRS are Quasi Co-Location TypeD (QCL-TypeD); or, when the CSI-RS is transmitted on the time domain symbols carrying the PSCCH DMRS, the CSI-RS and the PSCCH DMRS are QCL-TypeD.

In some embodiments, in a case that there is an overlap between time domain symbols carrying a PSCCH DMRS and time domain symbols occupied by a CSI-RS of the M CSI-RSs, the PSCCH DMRS is transmitted with a high priority; or in a case that there is an overlap between time domain symbols carrying a PSCCH and the time domain symbols occupied by the CSI-RS, the PSCCH is transmitted with a high priority; or in a case that the PSCCH DMRS and the CSI-RS occupy a same RE, the PSCCH DMRS is transmitted with a high priority; or in a case that the PSCCH and the CSI-RS occupy a same RE, the PSCCH is transmitted with a high priority.

In some embodiments, when there is an overlap between time domain symbols occupied by a CSI-RS of the M CSI-RSs and time domain symbols carrying second-stage SCI, the CSI-RS and the second-stage SCI are QCL-TypeD; or, when the CSI-RS is transmitted on the time domain symbols carrying the second-stage SCI, the CSI-RS and the second-stage SCI are QCL-TypeD.

In some embodiments, when there is an overlap between time domain symbols carrying second-stage SCI and time domain symbols occupied by a CSI-RS of the M CSI-RSs, the second-stage SCI is transmitted with a high priority; or, when the second-stage SCI and the CSI-RS occupy a same RE, the second-stage SCI is transmitted with a high priority.

In some embodiments, when there is an overlap between time domain symbols occupied by a CSI-RS of the M CSI-RSs and time domain symbols carrying a PSSCH DMRS, the CSI-RS and the PSSCH DMRS are QCL-TypeD; or, when the CSI-RS is transmitted on the time domain symbols carrying the PSSCH DMRS, the CSI-RS and the PSSCH DMRS are QCL-TypeD.

In some embodiments, when there is an overlap between time domain symbols carrying a PSSCH DMRS and time domain symbols occupied by a CSI-RS of the M CSI-RSs, the PSSCH DMRS is transmitted with a high priority; or, when the PSSCH DMRS and the CSI-RS occupy a same RE, the PSSCH DMRS is transmitted with a high priority.

In some embodiments, a measurement result of PSCCH-RSRP is used in at least one of a sensing process, a resource selection process, or a process of determining a candidate transmission resource set in a case that one of the following conditions is satisfied.

A CSI-RS resource configuration includes CSI-RS resources or a CSI-RS resource set for selecting a spatial domain transmission filter.

The CSI-RS resource configuration includes CSI-RS resources or a CSI-RS resource set for selecting a spatial domain reception filter.

The CSI-RS resource configuration includes CSI-RS resources or a CSI-RS resource set in which a repetition field takes a first value, and the first value is configured for indicating that the first terminal device transmits the CSI-RSs without using a same spatial domain transmission filter.

The CSI-RS resource configuration includes CSI-RS resources or a CSI-RS resource set in which a repetition field takes a second value, and the second value is configured for indicating that the first terminal device transmits the CSI-RSs using the same spatial domain transmission filter.

A CSI report quantity in the CSI-RS resource configuration is one of the following: a CRI, a CRI-RSRP, a CRI-SINR, no reporting or none.

Transmission of the CSI-RS resources in one slot using a plurality of spatial domain transmission filters is supported.

The CSI-RS resources and a PSSCH DMRS are allowed to be transmitted in a same time domain symbol.

There is an overlap between the CSI-RS resources and the PSSCH DMRS in time domain.

In some embodiments, the communication unit 310 is further configured to transmit first sidelink configuration information to the second terminal device.

The first sidelink configuration information includes at least one of the following: indexes of CSI-RS resources corresponding to the M CSI-RSs, an index of a CSI-RS resource set corresponding to the M CSI-RSs, a correspondence between the CSI-RS resource set corresponding to the M CSI-RSs and a CSI report quantity, a number of CSI-RS resources included in the CSI-RS resource set corresponding to the M CSI-RSs, a value of M, a value of N, indication information for indicating time domain symbols occupied by a first CSI-RS in the M CSI-RSs, indication information for determining a RE or sub-carrier carrying a CSI-RS of the M CSI-RSs in a physical resource block (PRB), a density of the CSI-RS, indication information for indicating whether to allow a PSSCH DMRS and the CSI-RS to overlap in time domain, indication information for indicating whether to allow a PSCCH and the CSI-RS resources to overlap in time domain, indication information for indicating whether to allow second-stage SCI and the CSI-RS resources to overlap in time domain, a number of CSI-RS resources reported or fed back by the second terminal device to the first terminal device, a maximum number of CSI-RSs allowed to be transmitted in a slot, a minimum number of CSI-RSs allowed to be transmitted in the slot, or a value of a repetition field corresponding to configuration information of the CSI-RS resources or the CSI-RS resource set corresponding to the M CSI-RSs.

The repetition field in the configuration information of the CSI-RS resources or the CSI-RS resource set corresponding to the M CSI-RSs taking a first value indicates that the first terminal device transmits the CSI-RSs without using a same spatial domain transmission filter, and the repetition field in the configuration information of the CSI-RS resources or the CSI-RS resource set corresponding to the M CSI-RSs taking a second value indicates that the first terminal device transmits the CSI-RSs using the same spatial domain transmission filter.

In some embodiments, the CSI report quantity includes at least one of the following: a CRI, a CRI-RSRP, a CRI-SINR, or no reporting.

In some embodiments, when the first terminal device transmits the CSI-RSs to the second terminal device in the first slot using the at least one spatial domain transmission filter, the communication unit 310 is further configured to carry CSI-RS resource indication information corresponding to the CSI-RSs in SCI in the first slot.

In some embodiments, the CSI-RS resource indication information corresponding to the CSI-RSs is configured for indicating at least one of a CSI-RS resource index corresponding to a first CSI-RS transmitted in the first slot or a number of the CSI-RSs transmitted in the first slot.

In some embodiments, the SCI in the first slot includes a bitmap, and the bitmap indicates at least one of a CSI-RS resource index corresponding to a first CSI-RS transmitted in the first slot or a number of the CSI-RSs transmitted in the first slot.

In some embodiments, the SCI in the first slot includes resource index information of a first CSI-RS transmitted in the first slot and information on a number of the CSI-RSs transmitted in the first slot.

In some embodiments, the SCI in the first slot includes resource index information of a first CSI-RS transmitted in the first slot.

In some embodiments, indexes of CSI-RS resources corresponding to the CSI-RSs transmitted in the first slot are sequentially ordered from an index of the first CSI-RS resource.

In some embodiments, a number of the CSI-RSs transmitted in the first slot is determined according to at least one of the following: a number of time domain symbols available for sidelink transmission in the first slot, a number of time domain symbols occupied by a PSCCH in the first slot, a number of time domain symbols occupied by a PSSCH DMRS in the first slot, a number of time domain symbols occupied by each CSI-RS resource in the first slot, or information regarding whether a PSFCH transmission resource is included in the first slot.

In some embodiments, the communication unit 310 is further configured to transmit second indication information to the second terminal device, and the second indication information is configured for indicating CSI-RS resource set information corresponding to the M CSI-RSs.

In some embodiments, frequency domain resources occupied by the M CSI-RSs do not exceed frequency domain resources of a PSSCH transmitted together with the M CSI-RSs.

In some embodiments, SCI in the first slot carries information indicating frequency domain resources occupied by the M CSI-RSs.

In some embodiments, part or all of a PSCCH DMRS, second-stage SCI and a PSSCH DMRS are transmitted in the first slot using a same spatial domain transmission filter; or, in the first slot, part or all of the PSCCH DMRS, the second-stage SCI and the PSSCH DMRS have a QCL-TypeD relationship.

In some embodiments, a PSSCH transmitted together with the M CSI-RSs includes at least one of redundant information or padding bits in a case that no valid sidelink data is transmitted in the first slot.

In some embodiments, the communication unit may be a communication interface or transceiver, or an input-output interface of a communication chip or a system-on-chip. The processing unit may be one or more processors.

It should be understood that the terminal device 300 according to the embodiments of the present disclosure may correspond to the first terminal device in the method embodiments of the present disclosure, and the above and other operations and/or functions of the units in the terminal device 300 are intended to implement the corresponding flow of the first terminal device in the method 200 illustrated in FIG. 14, respectively, which will not be elaborated herein for brief description.

Figure 26:
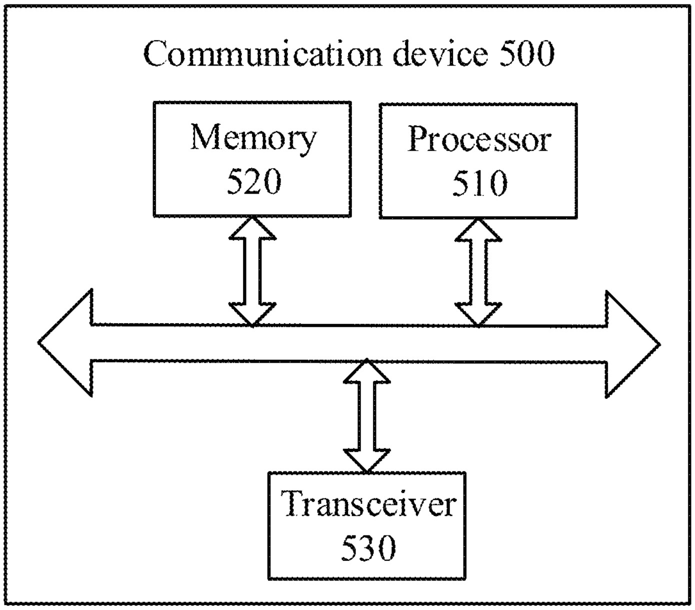
FIG. 26 is a schematic block diagram of a communication device provided by an embodiment of the present disclosure.

FIG. 26 illustrates a schematic block diagram of a terminal device 400 according to an embodiment of the present disclosure. The terminal device 400 is a second terminal device, and as illustrated in FIG. 26, and the terminal device 400 includes a communication unit 410.

The communication unit 410 is configured to receive M CSI-RSs transmitted by a first terminal device in a first slot using at least one spatial domain transmission filter.

The M CSI-RSs are configured for selecting a target spatial domain transmission filter, or the M CSI-RSs are configured for selecting a target spatial domain reception filter, and each of the M CSI-RSs occupies N time domain symbol(s). M and N are positive integers, and M>1.

In some embodiments, in a case that the M CSI-RSs are configured for selecting the target spatial domain transmission filter, a repetition field in configuration information of CSI-RS resources or a CSI-RS resource set corresponding to the M CSI-RSs takes a first value, and the first value is configured for indicating that the first terminal device transmits the CSI-RSs without using a same spatial domain transmission filter. In a case that the M CSI-RSs are configured for selecting the target spatial domain reception filter, the repetition field in the configuration information of the CSI-RS resources or the CSI-RS resource set corresponding to the M CSI-RSs takes a second value, and the second value is configured for indicating that the first terminal device transmits the CSI-RSs using the same spatial domain transmission filter.

In some embodiments, the communication unit 410 is further configured to receive first indication information transmitted by the first terminal device.

The first indication information is configured for indicating that the CSI-RSs transmitted by the first terminal device are configured for selecting a spatial domain transmission filter for the first terminal device to transmit sidelink data; or the first indication information is configured for indicating that the CSI-RSs transmitted by the first terminal device are configured for selecting a spatial domain reception filter for the second terminal device to receive the sidelink data; or the first indication information is configured for indicating that the CSI-RSs transmitted by the first terminal device are configured for measuring channel state information.

In some embodiments, in a case that the M CSI-RSs are configured for selecting the target spatial domain transmission filter, N≥2.

In some embodiments, the N time domain symbols include a first time domain symbol and a second time domain symbol. Data on the first time domain symbol is the same as data on the second time domain symbol, or the data on the first time domain symbol is duplication of the data on the second time domain symbol.

In some embodiments, the first time domain symbol is a first one in the N time domain symbols, and the second time domain symbol is a time domain symbol except the first time domain symbol in the N time domain symbols.

In some embodiments, the N time domain symbols further include a third time domain symbol, and the third time domain symbol is a GP symbol.

In some embodiments, the N time domain symbols include a fourth time domain symbol, and data on the fourth time domain symbol is mapped in a comb form.

In some embodiments, the first slot does not coincide with a slot in which a sidelink transmission is performed, and the slot in which the sidelink transmission is performed is a slot in which the first terminal device transmits sidelink data to other terminal devices using a first spatial domain transmission filter.

In some embodiments, in a case that the M CSI-RSs are configured for selecting the target spatial domain transmission filter, a difference between received power corresponding to any two of the M CSI-RSs is less than a first threshold.

In some embodiments, in a case that the M CSI-RSs are configured for selecting the target spatial domain transmission filter, a difference between received power corresponding to a first CSI-RS in the M CSI-RSs and received power corresponding to a CSI-RS of other M−1 CSI-RS(s) is less than a first threshold.

In some embodiments, in a case that the M CSI-RSs are configured for selecting the target spatial domain transmission filter, a difference between received power corresponding to any one of the M CSI-RSs and received power corresponding to a PSCCH in the first slot is less than a first threshold.

In some embodiments, N=1.

In some embodiments, the first threshold is agreed in protocol or pre-configured, or the first threshold is configured by a network device, or the first threshold is configured by the first terminal device.

In some embodiments, the at least one spatial domain transmission filter corresponding to the M CSI-RSs is different from a spatial domain transmission filter corresponding to a PSCCH.

In some embodiments, in a case that the M CSI-RSs are configured for selecting the target spatial domain reception filter, N≥1.

In some embodiments, the at least one spatial domain transmission filter corresponding to the M CSI-RSs is different from a spatial domain transmission filter corresponding to a PSCCH, or the at least one spatial domain transmission filter corresponding to the M CSI-RSs is the same as the spatial domain transmission filter corresponding to the PSCCH.

In some embodiments, the N time domain symbol(s) does not overlap in time domain with at least one of: a time domain symbol carrying SCI, a time domain symbol carrying a PSCCH, a time domain symbol carrying a PSSCH DMRS, a first symbol configured for sidelink transmission in a slot, a GP symbol in the slot, or a time domain symbol carrying a PSFCH.

In some embodiments, in the first slot, a time domain position occupied by a first CSI-RS is located after a last time domain symbol occupied by second-stage SCI.

In some embodiments, when there is an overlap between time domain symbols occupied by a CSI-RS of the M CSI-RSs and time domain symbols carrying a PSCCH DMRS, the CSI-RS and the PSCCH DMRS are Quasi Co-Location TypeD (QCL-TypeD); or when the CSI-RS is transmitted on the time domain symbols carrying the PSCCH DMRS, the CSI-RS and the PSCCH DMRS are QCL-TypeD.

In some embodiments, when there is an overlap between time domain symbols carrying a PSCCH DMRS and time domain symbols occupied by a CSI-RS of the M CSI-RSs, the PSCCH DMRS is transmitted with a high priority; or when there is an overlap between time domain symbols carrying a PSCCH and the time domain symbols occupied by the CSI-RS, the PSCCH is transmitted with a high priority; or when the PSCCH DMRS and the CSI-RS occupy a same RE, the PSCCH DMRS is transmitted with a high priority; or when the PSCCH and the CSI-RS occupy a same RE, the PSCCH is transmitted with a high priority.

In some embodiments, when there is an overlap between time domain symbols occupied by a CSI-RS of the M CSI-RSs and time domain symbols carrying second-stage SCI, the CSI-RS and the second-stage SCI are QCL-TypeD; or when the CSI-RS is transmitted on the time domain symbols carrying the second-stage SCI, the CSI-RS and the second-stage SCI are QCL-TypeD.

In some embodiments, when there is an overlap between time domain symbols carrying second-stage SCI and time domain symbols occupied by a CSI-RS of the M CSI-RSs, the second-stage SCI is transmitted with a high priority; or when the second-stage SCI and the CSI-RS occupy a same RE, the second-stage SCI is transmitted with a high priority.

In some embodiments, when there is an overlap between time domain symbols occupied by a CSI-RS of the M CSI-RSs and time domain symbols carrying a PSSCH DMRS, the CSI-RS and the PSSCH DMRS are QCL-TypeD; or when the CSI-RS is transmitted on the time domain symbols carrying the PSSCH DMRS, the CSI-RS and the PSSCH DMRS are QCL-TypeD.

In some embodiments, when there is an overlap between time domain symbols carrying a PSSCH DMRS and time domain symbols occupied by a CSI-RS of the M CSI-RSs, the PSSCH DMRS is transmitted with a high priority; or when the PSSCH DMRS and the CSI-RS occupy a same RE, the PSSCH DMRS is transmitted with a high priority.

In some embodiments, a measurement result of PSCCH-RSRP is used in at least one of a sensing process, a resource selection process, or a process of determining a candidate transmission resource set in a case that one of the following conditions is satisfied.

A CSI-RS resource configuration includes CSI-RS resources or a CSI-RS resource set for selecting a spatial domain transmission filter.

The CSI-RS resource configuration includes CSI-RS resources or a CSI-RS resource set for selecting a spatial domain reception filter.

The CSI-RS resource configuration includes CSI-RS resources or a CSI-RS resource set in which a repetition field takes a first value, and the first value is configured for indicating that the first terminal device transmits the CSI-RSs without using a same spatial domain transmission filter.

The CSI-RS resource configuration includes CSI-RS resources or a CSI-RS resource set in which a repetition field takes a second value, and the second value is configured for indicating that the first terminal device transmits the CSI-RSs using the same spatial domain transmission filter.

A CSI report quantity included in the CSI-RS resource configuration is one of the following: a CRI, a CRI-RSRP, or a CRI-SINR.

The CSI-RS resource configuration includes an empty CSI-RS resource or an empty CSI-RS resource set.

Transmission of the CSI-RS resource in one slot using a plurality of spatial domain transmission filters is supported.

The CSI-RS resources and a PSSCH DMRS are allowed to be transmitted in a same time domain symbol.

There is an overlap between the CSI-RS resources and the PSSCH DMRS in time domain.

In some embodiments, the communication unit 410 is further configured to receive first sidelink configuration information transmitted by the first terminal device.

The first sidelink configuration information includes at least one of the following: indexes of CSI-RS resources corresponding to the M CSI-RSs, an index of a CSI-RS resource set corresponding to the M CSI-RSs, a correspondence between the CSI-RS resource set corresponding to the M CSI-RSs and a CSI report quantity, a number of CSI-RS resources included in the CSI-RS resource set corresponding to the M CSI-RSs, a value of M, a value of N, indication information for indicating time domain symbols occupied by a first CSI-RS in the M CSI-RSs, indication information for determining a RE or sub-carrier carrying a CSI-RS of the M CSI-RSs in a physical resource block (PRB), a density of the CSI-RS, indication information for indicating whether to allow a PSSCH DMRS and the CSI-RS to overlap in time domain, indication information for indicating whether to allow a PSCCH and the CSI-RS resources to overlap in time domain, indication information for indicating whether to allow second-stage SCI and the CSI-RS resources to overlap in time domain, a number of CSI-RS resources reported or fed back by the second terminal device to the first terminal device, a maximum number of CSI-RSs allowed to be transmitted in a slot, a minimum number of CSI-RSs allowed to be transmitted in the slot, or a value of a repetition field in configuration information of the CSI-RS resources or the CSI-RS resource set corresponding to the M CSI-RSs.

The repetition field in the configuration information of the CSI-RS resources or the CSI-RS resource set corresponding to the M CSI-RSs taking a first value indicates that the first terminal device transmits the CSI-RSs without using a same spatial domain transmission filter, and the repetition field in the configuration information of the CSI-RS resources or the CSI-RS resource set corresponding to the M CSI-RSs taking a second value indicates that the first terminal device transmits the CSI-RSs using the same spatial domain transmission filter.

In some embodiments, the CSI report quantity includes at least one of the following: a CRI, a CRI-RSRP, a CRI-SINR, or no reporting.

In some embodiments, when the first terminal device transmits the CSI-RSs in the first slot using the at least one spatial domain transmission filter, the communication unit 410 is further configured to receive CSI-RS resource indication information corresponding to the CSI-RSs carried by the first terminal device in SCI in the first slot.

In some embodiments, the CSI-RS resource indication information corresponding to the CSI-RSs is configured for indicating at least one of a CSI-RS resource index corresponding to a first CSI-RS transmitted in the first slot or a number of the CSI-RSs transmitted in the first slot.

In some embodiments, the SCI in the first slot includes a bitmap, and the bitmap indicates at least one of a CSI-RS resource index corresponding to a first CSI-RS transmitted in the first slot or a number of the CSI-RSs transmitted in the first slot.

In some embodiments, the SCI in the first slot includes resource index information of a first CSI-RS transmitted in the first slot and information on a number of the CSI-RSs transmitted in the first slot.

In some embodiments, the SCI in the first slot includes resource index information of a first CSI-RS transmitted in the first slot.

In some embodiments, indexes of CSI-RS resources corresponding to the CSI-RSs transmitted in the first slot are sequentially ordered from an index of the first CSI-RS resource.

In some embodiments, a number of the CSI-RSs transmitted in the first slot is determined according to at least one of the following: a number of time domain symbols available for sidelink transmission in the first slot, a number of time domain symbols occupied by a PSCCH in the first slot, a number of time domain symbols occupied by a PSSCH DMRS in the first slot, a number of time domain symbols occupied by each CSI-RS resource in the first slot, or information regarding whether a PSFCH transmission resource is included in the first slot.

In some embodiments, the communication unit 410 is further configured to receive second indication information transmitted by the first terminal device. The second indication information is configured for indicating CSI-RS resource set information corresponding to the M CSI-RSs.

In some embodiments, frequency domain resources occupied by the M CSI-RSs do not exceed frequency domain resources of a PSSCH transmitted together with the M CSI-RSs.

In some embodiments, SCI in the first slot carries information indicating frequency domain resources occupied by the CSI-RSs.

In some embodiments, in the first slot, part or all of a PSCCH DMRS, second-stage SCI and a PSSCH DMRS are transmitted using a same spatial domain transmission filter; or in the first slot, part or all of the PSCCH DMRS, the second-stage SCI and the PSSCH DMRS have a QCL-TypeD relationship.

In some embodiments, a PSSCH transmitted together with the M CSI-RSs includes at least one of redundant information or padding bits in a case that no valid sidelink data is transmitted in the first slot.

In some embodiments, the communication unit may be a communication interface or transceiver, or an input-output interface of a communication chip or a system-on-chip.

It should be understood that the terminal device 400 according to the embodiments of the present disclosure may correspond to the second terminal device in the method embodiments of the present disclosure, and the above and other operations and/or functions of the units in the terminal device 400 are intended to implement the corresponding flow of the second terminal device in the method 200 illustrated in FIG. 14, respectively, which will not be elaborated herein for brief description.

FIG. 26 is a schematic structural diagram of a communication device 500 provided by an embodiment of the present disclosure. The communication device 500 illustrated in FIG. 26 includes a processor 510. The processor 510 may call and run a computer program from a memory to implement the method in the embodiments of the present disclosure.

In some embodiments, as illustrated in FIG. 26, the communication device 500 may also include a memory 520. The processor 510 may call and run a computer program from the memory 520 to implement the method in the embodiments of the present disclosure.

The memory 520 may be a separate device from the processor 510, or may be integrated in the processor 510.

In some embodiments, as illustrated in FIG. 26, the communication device 500 may also include a transceiver 530. The processor 510 may control the transceiver 530 to communicate with other devices, specifically to transmit information or data to other devices, or receive information or data transmitted by other devices.

The transceiver 530 may include a transmitter and a receiver. The transceiver 530 may further include antennas. The number of antennas may be one or more.

In some embodiments, the communication device 500 may specifically be a terminal device of embodiments of the present disclosure, and the communication device 500 may implement corresponding flows implemented by the first terminal device in each method of the embodiments of the present disclosure, which will not be elaborated herein for brief description.

In some embodiments, the communication device 500 may specifically be a terminal device of embodiments of the present disclosure, and the communication device 500 may implement corresponding flows implemented by the second terminal device in each method of the embodiments of the present disclosure, which will not be elaborated herein for brief description.

Figure 27:
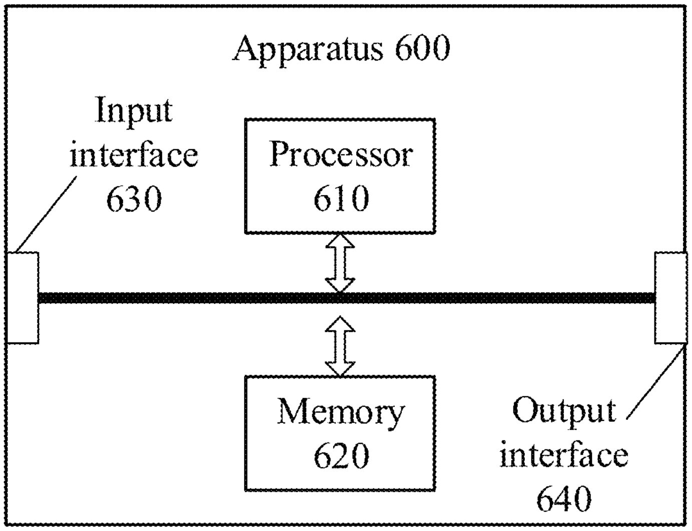
FIG. 27 is a schematic block diagram of an apparatus provided by an embodiment of the present disclosure.

FIG. 27 is a schematic structural diagram of an apparatus according to an embodiment of the present disclosure. An apparatus 600 illustrated in FIG. 27 includes a processor 610. The processor 610 may call and run a computer program from a memory to implement the method in the embodiments of the present disclosure.

In some embodiments, as illustrated in FIG. 27, the apparatus 600 may also include a memory 620. The processor 610 may call and run a computer program from the memory 620 to implement the method in the embodiments of the present disclosure.

The memory 620 may be a separate device from the processor 610, or may be integrated in the processor 610.

In some embodiments, the apparatus 600 may also include an input interface 630. The processor 610 may control the input interface 630 to communicate with other devices or chips, in particular to obtain information or data transmitted by other devices or chips.

In some embodiments, the apparatus 600 may also include an output interface 640. The processor 610 may control the output interface 640 to communicate with other devices or chips, in particular to output information or data to other devices or chips.

In some embodiments, the apparatus may be applied to the terminal device of the embodiments of the present disclosure, and the apparatus may implement corresponding flows implemented by the first terminal device in each method of the embodiments of the present disclosure, which will not be elaborated herein for brief description.

In some embodiments, the apparatus may be applied to the terminal device of the embodiments of the present disclosure, and the apparatus may implement corresponding flows implemented by the second terminal device in each method of the embodiments of the present disclosure, which will not be elaborated herein for brief description.

In some embodiments, the apparatus mentioned in the embodiment of the present disclosure may also be a chip, for example, may be a system-level chip, a system chip, a chip system, a system on chip, or the like.

Figure 28:
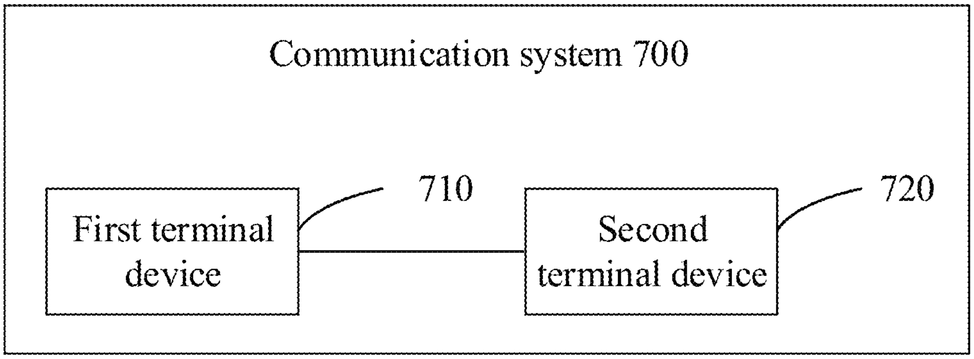
FIG. 28 is a schematic block diagram of a communication system provided by an embodiment of the present disclosure.

FIG. 28 is a schematic block diagram of a communication system 700 provided by an embodiment of the present disclosure. As illustrated in FIG. 28, the communication system 700 includes a first terminal device 710 and a second terminal device 720.

The first terminal device 710 may be configured to implement corresponding functions implemented by the first terminal device in the above method, and the second terminal device 720 may be configured to implement corresponding functions implemented by the second terminal in the above method, which will not be elaborated herein for brief description.

It is to be understood that the processor in the embodiments of the disclosure may be an integrated circuit chip and has a signal processing capacity. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logic device, a discrete gate or transistor logic device, and a discrete hardware component. Each method, operation, and logical block diagram disclosed in the embodiments of the disclosure may be implemented or executed. The universal processor may be a microprocessor, or the processor may be any conventional processor, etc. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM), and a register. The storage medium is in a memory. The processor reads information in the memory and completes the operations of the method in combination with hardware.

It can be understood that the memory in the embodiments of the disclosure may be a volatile memory or a nonvolatile memory, or may include both the volatile and nonvolatile memories. The nonvolatile memory may be a ROM, a PROM, an Erasable PROM (EPROM), an EEPROM, or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM, and a DR RAM. That is, the memory in the embodiments of the disclosure is intended to include, but not limited to, memories of these and any other proper types.

An embodiment of the present disclosure also provides a computer-readable storage medium, which is configured to store a computer program.

In some embodiments, the computer-readable storage medium may be applied to the terminal device of the embodiments of the present disclosure, and the computer program causes a computer to implement corresponding flows implemented by the first terminal device in the methods of the embodiments of the present disclosure, which will not be elaborated herein for brief description.

In some embodiments, the computer-readable storage medium may be applied to the terminal device of the embodiments of the present disclosure, and the computer program causes a computer to implement corresponding flows implemented by the second terminal device in the methods of the embodiments of the present disclosure, which will not be elaborated herein for brief description.

An embodiment of the present disclosure also provides a computer program product, which includes computer program instructions.

In some embodiments, the computer program product may be applied to the terminal device of the embodiments of the present disclosure, and the computer program instructions cause a computer to implement corresponding flows implemented by the first terminal device in the methods of the embodiments of the present disclosure, which will not be elaborated herein for brief description.

In some embodiments, the computer program product may be applied to the terminal device of the embodiments of the present disclosure, and the computer program instructions cause a computer to implement corresponding flows implemented by the second terminal device in the methods of the embodiments of the present disclosure, which will not be elaborated herein for brief description.

An embodiment of the present disclosure also provides a computer program.

In some embodiments, the computer program may be applied to the terminal device of the embodiments of the present disclosure. The computer program, when run on a computer, causes the computer to implement corresponding flows implemented by the first terminal device in the methods of the embodiments of the present disclosure, which will not be elaborated herein for brief description.

In some embodiments, the computer program may be applied to the terminal device of the embodiments of the present disclosure. The computer program, when run on a computer, causes the computer to implement corresponding flows implemented by the second terminal device in the methods of the embodiments of the present disclosure, which will not be elaborated herein for brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed by hardware or software depends on specific applications and design constraints of the technical solutions. Professionals may realize the described functions for each specific application by use of different methods, but such realization shall fall within the scope of the disclosure.

Those skilled in the art may clearly learn about that specific working processes of the system, apparatus, and unit described above may refer to the corresponding processes in the method embodiments and will not be elaborated herein for convenient and brief description.

In some embodiments provided by the disclosure, it is to be understood that the disclosed system, device, and method may be implemented in another manner. For example, the device embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of the device or the units, and may be electrical and mechanical or adopt other forms.

The units described as separate parts may or may not be physically separated, and parts displayed as units may or may not be physical units, namely they may be located in the same place, or may be distributed to multiple network units. Part or all of the units may be selected to achieve the purposes of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for wireless communication, comprising:

transmitting, by a first terminal device, M channel state information reference signals (CSI-RSs) to a second terminal device in a first slot using at least one spatial domain transmission filter;

wherein the M CSI-RSs are configured for selecting a target spatial domain transmission filter, or the M CSI-RSs are configured for selecting a target spatial domain reception filter, and each of the M CSI-RSs occupies N time domain symbol(s), M and N are positive integers, and M>1; and transmitting, by the first terminal device, first indication information to the second terminal device;

wherein the first indication information is configured for indicating that the CSI-RSs transmitted by the first terminal device are configured for selecting a spatial domain transmission filter for the first terminal device to transmit sidelink data; or the first indication information is configured for indicating that the CSI-RSs transmitted by the first terminal device are configured for selecting a spatial domain reception filter for the second terminal device to receive the sidelink data; or the first indication information is configured for indicating that the CSI-RSs transmitted by the first terminal device are configured for measuring channel state information;

in a case that the M CSI-RSs are configured for selecting the target spatial domain transmission filter, N≥2, the N time domain symbols comprise a first time domain symbol and a second time domain symbol, and data on the first time domain symbol is the same as data on the second time domain symbol, or the data on the first time domain symbol is duplication of the data on the second time domain symbol.

2. The method of claim 1, wherein in a case that the M CSI-RSs are configured for selecting the target spatial domain transmission filter, a difference between received power corresponding to any one of the M CSI-RSs and received power corresponding to a physical sidelink control channel (PSCCH) in the first slot is less than a first threshold.

3. The method of claim 1, wherein in a case that the M CSI-RSs are configured for selecting the target spatial domain reception filter, N≥1.

4. The method of claim 1, wherein the N time domain symbol(s) does not overlap in time domain with at least one of:

a time domain symbol carrying second-stage sidelink control information (SCI), a time domain symbol carrying a PSCCH, a time domain symbol carrying a physical sidelink shared channel demodulation reference signal (PSSCH DMRS), a first symbol configured for sidelink transmission in a slot, a guard period (GP) symbol in the slot, or a time domain symbol carrying a physical sidelink feedback channel (PSFCH).

5. The method of claim 1, wherein in the first slot, a time domain position occupied by a first CSI-RS is located after a last time domain symbol occupied by second-stage SCI.

6. The method of claim 1, wherein in a case that there is an overlap between time domain symbols occupied by a CSI-RS of the M CSI-RSs and time domain symbols carrying a physical sidelink control channel demodulation reference signal (PSCCH DMRS), the CSI-RS and the PSCCH DMRS are Quasi Co-Location TypeD (QCL-TypeD), or, when the CSI-RS is transmitted on the time domain symbols carrying the PSCCH DMRS, the CSI-RS and the PSCCH DMRS are QCL-TypeD;

in a case that there is an overlap between time domain symbols occupied by a CSI-RS of the M CSI-RSs and time domain symbols carrying second-stage SCI, the CSI-RS and the second-stage SCI are QCL-TypeD, or, when the CSI-RS is transmitted on the time domain symbols carrying the second-stage SCI, the CSI-RS and the second-stage SCI are QCL-TypeD;

in a case that there is an overlap between time domain symbols carrying second-stage SCI and time domain symbols occupied by a CSI-RS of the M CSI-RSs, the second-stage SCI is transmitted with a high priority, or, in a case that the second-stage SCI and the CSI-RS occupy a same RE, the second-stage SCI is transmitted with a high priority;

in a case that there is an overlap between time domain symbols occupied by a CSI-RS of the M CSI-RSs and time domain symbols carrying a PSSCH DMRS, the CSI-RS and the PSSCH DMRS are QCL-TypeD, or, when the CSI-RS is transmitted on the time domain symbols carrying the PSSCH DMRS, the CSI-RS and the PSSCH DMRS are QCL-TypeD;

in a case that there is an overlap between time domain symbols carrying a PSSCH DMRS and time domain symbols occupied by a CSI-RS of the M CSI-RSs, the PSSCH DMRS is transmitted with a high priority; or, in a case that the PSSCH DMRS and the CSI-RS occupy a same RE, the PSSCH DMRS is transmitted with a high priority.

7. The method of claim 1, further comprising:

transmitting, by the first terminal device, first sidelink configuration information to the second terminal device;

wherein the first sidelink configuration information comprises at least one of the following:

indexes of CSI-RS resources corresponding to the M CSI-RSs, an index of a CSI-RS resource set corresponding to the M CSI-RSs, a correspondence between the CSI-RS resource set corresponding to the M CSI-RSs and a CSI report quantity, a number of CSI-RS resources comprised in the CSI-RS resource set corresponding to the M CSI-RSs, a value of M, a value of N, indication information for indicating time domain symbols occupied by a first CSI-RS in the M CSI-RSs, indication information for determining a RE or subcarrier carrying a CSI-RS of the M CSI-RSs in a physical resource block (PRB), a density of the CSI-RS, indication information for indicating whether to allow a PSSCH DMRS and the CSI-RS to overlap in time domain, indication information for indicating whether to allow a PSCCH and the CSI-RS resources to overlap in time domain, indication information for indicating whether to allow second-stage SCI and the CSI-RS resources to overlap in time domain, a number of CSI-RS resources reported or fed back by the second terminal device to the first terminal device, a maximum number of CSI-RSs allowed to be transmitted in a slot, a minimum number of CSI-RSs allowed to be transmitted in the slot, or a value of a repetition field in configuration information of the CSI-RS resources or the CSI-RS resource set corresponding to the M CSI-RSs;

wherein the repetition field in the configuration information of the CSI-RS resources or the CSI-RS resource set corresponding to the M CSI-RSs taking a first value indicates that the first terminal device transmits the CSI-RSs without using a same spatial domain transmission filter, and the repetition field in the configuration information of the CSI-RS resources or the CSI-RS resource set corresponding to the M CSI-RSs taking a second value indicates that the first terminal device transmits the CSI-RSs using the same spatial domain transmission filter.

8. The method of claim 1, further comprising:

in a case that the first terminal device transmits the CSI-RSs to the second terminal device in the first slot using the at least one spatial domain transmission filter, carrying, by the first terminal device, CSI-RS resource indication information corresponding to the CSI-RSs in SCI in the first slot.

9. The method of claim 8, wherein the CSI-RS resource indication information corresponding to the CSI-RSs is configured for indicating at least one of a CSI-RS resource index corresponding to a first CSI-RS transmitted in the first slot or a number of the CSI-RSs transmitted in the first slot.

10. The method of claim 8, further comprising:

transmitting, by the first terminal device, second indication information to the second terminal device, the second indication information being configured for indicating CSI-RS resource set information corresponding to the M CSI-RSs.

11. The method of claim 1, wherein SCI in the first slot carries information indicating frequency domain resources occupied by the CSI-RSs.

12. The method of claim 1, wherein part or all of a PSCCH DMRS, second-stage SCI and a PSSCH DMRS are transmitted in the first slot using a same spatial domain transmission filter; or part or all of the PSCCH DMRS, the second-stage SCI and the PSSCH DMRS have a QCL-TypeD relationship in the first slot.

13. A terminal device, the terminal device being a first terminal device and comprising: a processor and a memory for storing a computer program, wherein the processor is configured to call and run the computer program to cause the terminal device to:

transmit M channel state information reference signals (CSI-RSs) to a second terminal device in a first slot using at least one spatial domain transmission filter;

wherein the M CSI-RSs are configured for selecting a target spatial domain transmission filter, or the M CSI-RSs are configured for selecting a target spatial domain reception filter, and each of the M CSI-RSs occupies N time domain symbol(s), M and N are positive integers, and M>1; and transmit first indication information to the second terminal device;

wherein the first indication information is configured for indicating that the CSI-RSs transmitted by the first terminal device are configured for selecting a spatial domain transmission filter for the first terminal device to transmit sidelink data; or the first indication information is configured for indicating that the CSI-RSs transmitted by the first terminal device are configured for selecting a spatial domain reception filter for the second terminal device to receive the sidelink data; or the first indication information is configured for indicating that the CSI-RSs transmitted by the first terminal device are configured for measuring channel state information;

in a case that the M CSI-RSs are configured for selecting the target spatial domain transmission filter, N≥2, the N time domain symbols comprise a first time domain symbol and a second time domain symbol, and data on the first time domain symbol is the same as data on the second time domain symbol, or the data on the first time domain symbol is duplication of the data on the second time domain symbol.

14. A terminal device, the terminal device being a second terminal device and comprising: a processor and a memory for storing a computer program, wherein the processor is configured to call and run the computer program to cause the terminal device to:

receive M channel state information reference signals (CSI-RSs) transmitted by a first terminal device in a first slot using at least one spatial domain transmission filter;

wherein the M CSI-RSs are configured for selecting a target spatial domain transmission filter, or the M CSI-RSs are configured for selecting a target spatial domain reception filter; and each of the M CSI-RSs occupies N time domain symbol(s), M and N are positive integers, and M>1; and receive first indication information transmitted by the first terminal device;

wherein the first indication information is configured for indicating that the CSI-RSs transmitted by the first terminal device are configured for selecting a spatial domain transmission filter for the first terminal device to transmit sidelink data; or the first indication information is configured for indicating that the CSI-RSs transmitted by the first terminal device are configured for selecting a spatial domain reception filter for the second terminal device to receive the sidelink data; or the first indication information is configured for indicating that the CSI-RSs transmitted by the first terminal device are configured for measuring channel state information;

in a case that the M CSI-RSs are configured for selecting the target spatial domain transmission filter, N≥2, the N time domain symbols comprise a first time domain symbol and a second time domain symbol, and data on the first time domain symbol is the same as data on the second time domain symbol, or the data on the first time domain symbol is duplication of the data on the second time domain symbol.

15. The terminal device of claim 14, wherein in a case that the M CSI-RSs are configured for selecting the target spatial domain transmission filter, a difference between received power corresponding to any one of the M CSI-RSs and received power corresponding to a physical sidelink control channel (PSCCH) in the first slot is less than a first threshold.

* * * * *